US006251983B1

(12) United States Patent
Vogler et al.

(10) Patent No.: US 6,251,983 B1
(45) Date of Patent: *Jun. 26, 2001

(54) INVERSION CARBON BLACKS AND METHOD FOR THEIR MANUFACTURE

(75) Inventors: Conny Vogler, Bornheim-Sechtem; Karl Vogel, Alzenau; Werner Niedermeier, Brühl; Burkhard Freund, Erftstadt; Paul Messer, Brühl, all of (DE)

(73) Assignee: Degussa - Hüls Aktiengesellschaft, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/329,313

(22) Filed: Jun. 10, 1999

Related U.S. Application Data

(63) Continuation-in-part of application No. 09/289,185, filed on Apr. 9, 1999, which is a continuation-in-part of application No. 09/160,143, filed on Sep. 25, 1998, now Pat. No. 6,056,933.
(60) Provisional application No. 60/101,772, filed on Sep. 25, 1998.

(30) Foreign Application Priority Data

| Apr. 9, 1998 | (DE) | 198 16 025 |
| Sep. 2, 1998 | (DE) | 198 39 925 |

(51) Int. Cl.[7] .................................................. C08K 3/03
(52) U.S. Cl. ........................ 524/496; 525/495; 423/449.1
(58) Field of Search ...................... 423/449.1; 524/495, 524/496

(56) References Cited

U.S. PATENT DOCUMENTS

| 5,179,154 | 1/1993 | Muraki et al. . |
| 6,056,932 | * 5/2000 | Vogler et al. ...................... 423/449.1 |

FOREIGN PATENT DOCUMENTS

| 4308488A | 9/1994 | (DE) . |
| 195 21 565 | 6/1995 | (DE) . |
| 0315442B1 | 11/1988 | (EP) . |
| 0608892A | 8/1994 | (EP) . |
| WO 9113944A | 9/1991 | (WO) . |
| WO91/13944 | 9/1991 | (WO) . |

OTHER PUBLICATIONS

K. Grosch, "Rolling Resistance and Fatigue Life of Tires," Paper presented at the 131st meeting of the Rubber Division, American Chemical Society; 1987.
Y. Boma554431, et al., "Developments in Silica Usage for Decreased Tyre Rolling Resistance," KGK Kautschuk Gummi Kunsststoffe 50. Jahrgang, Nr. 6/97, p. 434–441;
W. Niedermeier et al., "Progress In The Development of Inversion Carbon Blacks," Tire Technology International, p. 25–32, 1998.

G. Heinrich et al., "Physical Adsorption of Polymers On disordered Filler Surfaces," Rubber Chemistry and Technology, p. 26–36, vol. 68, 1995.
K. A. Grosch, et al., "Laborbestimmung der Abrieb–und Rutschfestigkeit von Lauffachenmischungen—Teil I: Rutschfestigkeit," KGK Kaustschuk Gummi Kunststoffe 49. Jahrgang, p. 432–441, 6/96; In German language.
K. A. Grosch, et al., "A New Laboratory Method to Determiner the Traction and Wear Properties of Tire Tread Compounds," KGK Kautschuk Gummi Kunststoffe 50. Jahrgang, Nr. 6/97, p. 841–851.
H. Lüchow et al., "Characterization of Polymer Adsorption On Disordered Filler Surfaces by Transversal $^1$H NMR Relazation," Rubber Chemistry and Technology, vol. 70, p. 737–767, 1996.
W. Niedermeier et al. "The Microstructure of Carbon Black Investigated by Atomic Force Microscopy," KGK Kautschuk Gummi Kunststoffe 47. Jahrgang, Nr. 11/94, p. 799–805.
K. A. Gorsch, "A New Way to Evaluate Traction–and Wear Properties of Tire Tread Compounds," Paper presented at a meeting of the Rubber Division, American Chemical Society; Oct. 1997.
J. F. Gouglas, "Polymer–Surface Interactions," Macromolecules, vol. 22, No. 9, p. 3711–3716, 1989.
A. H. Verlag, "Status and Global Trends in Rubber Carbon Blacks," KGK Kautschuk Gummi Kunststoffe, vol. 43 (1990), No. 12, p. 1082–1085.
B. Freund, "Low Rolling Resistance Tread Compounds, " KGK Kautschuk Gummi Kunststoffe 49. Jahrgang, Nr. 11/96, p. 774–784.
H. Mouri et al., "Reducing Energy Loss to Improve Tire Rolling Resistance," Paper presented at the 151st Meeting of the Rubber Division, American Chemical Society, May 1997.
B. Davis, "Rolling Resistance Is Top Priority," European Rubber Journal, May 1996.
W. Gronski et al., "NMR Relaxion—A Method Relevant for Technical Properties of Carbon Black Filled Rubbers," Mittwoch, p. 107–109, vol. 68, 1995.

(List continued on next page.)

Primary Examiner—Edward J. Cain
(74) Attorney, Agent, or Firm—Smith Gambrell & Russell, LLP

(57) ABSTRACT

Inversion carbon blacks and a method for their manufacture are disclosed. The inversion carbon blacks have a lower rolling resistance with identical or improved wet skid behavior. The particle size distribution contains a smaller proportion of particles with large diameters. This leads to an improved abrasion behavior of rubber compounds which were prepared using these carbon blacks. The inversion carbon blacks can be manufactured in conventional carbon black reactors by controlling the combustion in the combustion chamber in such a manner that carbon black nuclei form, which are immediately brought into contact with the carbon black raw material. The carbon blacks present a lower proportion of larger particles if the additions of combustion air and carbon black raw material are increased in an appropriate manner.

13 Claims, 20 Drawing Sheets

OTHER PUBLICATIONS

J. Fröhlich et al., "Surface Characterization of Carbon Blacks," *KGK Kautschuk Gummi Kunststoffe* 51, Jahrgang, Nr. 5/98, p. 370–375.

P. Sotta et al., "Effect of Residual Dipolar Interactions on the NMR Relaxation in Cross–Linked Elastomers," Macromolecules, vol. 29, 1996, 6222–6230.

B. Freund et al., "Molekulare Deutung des Payne–Effektes und Beeinflussung durch Füllstoffe," *KGK Kautschuk Gummi Kunststoffe* 51. Jahrgang, Nr. 6/98, p. 444–449; In German Language.

P. G. Maier et al., "Molecular Interpretation of the Payne Effect," *KGK Kautschuk Gummi Kunststoffe* 49. Jahrgang, Nr. 96, p. 18–21.

Lothas Sachs, "Statistical Evaluation Methods," p. 81–83, in German, Spring–Verlag, Berlin, 3rd Edition; and Carbon Blacks, 2nd Edition, Marcel Dekker, Inc., New York, 1993, p. 20,43.

H. Wolf, et al., "Status and Global Trends In Rubber Carbon Blacks," *Kautschuk Gummi Kunststoffe*, vol. 43, No. 12, p. 1082–1085, 1990.

\* cited by examiner

FIG. 4
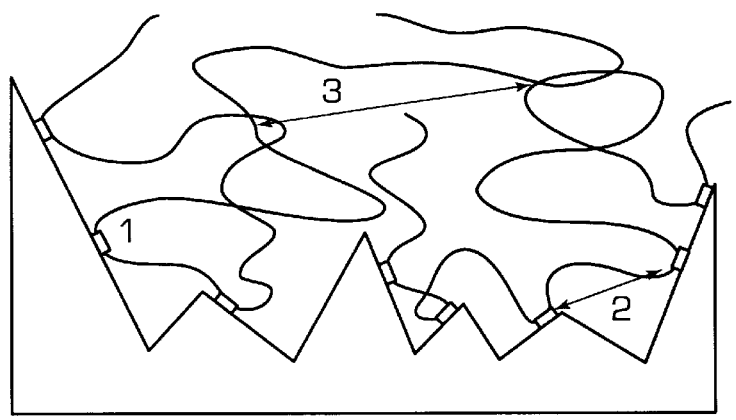
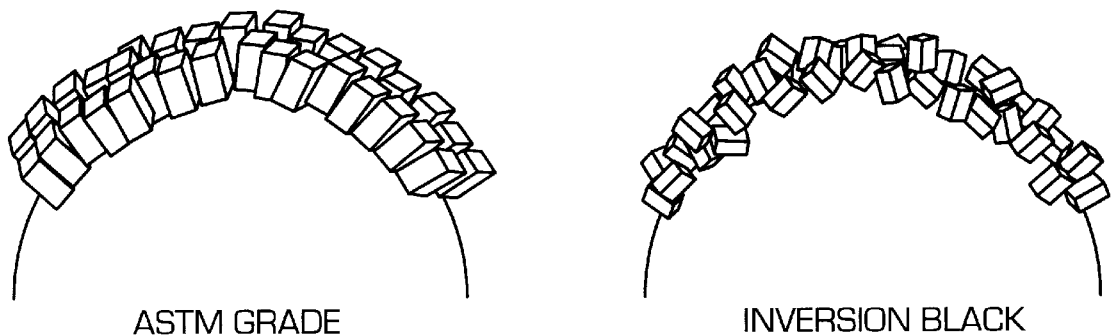
ASTM GRADE                INVERSION BLACK
FIG. 5A                    FIG. 5B

INVERSION CARBON BLACKS AND METHOD FOR THEIR MANUFACTURE

CROSS-REFERENCE TO RELATED APPLICATIONS

This application is a continuation-in-part application of U.S. patent application Ser. No. 09/289,185, filed Apr. 9, 1999; U.S. patent application Ser. No. 09/160,143, filed Sep. 25, 1998 now U.S. Pat. No. 6,056,933, issued May 2, 2000; and U.S. Provisional Patent Application No. 60/101,772, filed Sep. 25, 1998. These related applications are relied on and incorporated herein by reference in their entirety.

BACKGROUND OF THE INVENTION

The present invention relates to improved inversion carbon blacks as well as a method for their manufacture.

Carbon blacks are used extensively as reinforcement carbon blacks in rubber compounds used in the tire industry. The proper-ties of carbon blacks in this context have an influence, together with the properties of the rubber compounds used, on the performance properties of the completed tires.

The required properties are high abrasion resistance, low rolling resistance, and good adhesion in the case of wet road conditions. The last two properties are influenced essentially by the viscoelastic behavior of the tread compound. In the case of periodic deformation, the viscoelastic behavior can be described by the mechanical loss factor $\tan \delta$, and in the case of elongation or compression, the viscoelastic behavior can be described by the dynamic elongation modulus $|E^*|$. Both magnitudes of these values are strongly temperature dependent. The adhesion to wet roads is, in this context, directly correlated with the loss factor $\tan \delta_0$ at approximately 0° C., and the rolling resistance with the loss factor $\tan \delta_{60}$ at approximately 60° C. The higher the loss factor is at low temperature, the better the adhesion of the tire composition to a wet road usually is. To reduce the rolling resistance, in contrast, a loss factor which is as small as possible at high temperature is required.

The abrasion resistance and the viscoelastic properties, and thus also the loss factor of the tread compounds, are essentially determined by the properties of the reinforcement carbon blacks used. Here, the essential parameter is the specific surface area, particularly the CTAB surface area, which is a measure of the rubber active surface area portion of the carbon black. As the CTAB surface area increases, the abrasion resistance and $\tan \delta$ increase.

Other important carbon black parameters are the DBP absorption and the 24M4-DBP absorption as measured numbers for the starting structure, respecting the residual structure which still remains after mechanically stressing the carbon black, as well as the specific surface area (BET-surface area) of the carbon black as determined according to DIN 66132.

The identified carbon black parameters are dependent on the form of the carbon black particles. In the course of carbon black preparation, there is formed first the so-called primary particles with a diameter of 10 to 500 nm, which then grow into solid three dimensional aggregates. The spatial structure and the particle size distribution as parameters to be measured are exhibited in the precipitation.

For tread compounds, the suitable carbon blacks present a CTAB surface area of 20-190 m$^2$/g and 24M4-DBP absorption values of 40–140 mL/100 g.

The average particle diameter of the carbon black aggregate is used for the classification of the carbon blacks according to ASTM D-1765. This classification consists of a four-digit alphanumerical nomenclature, where the first letter (an N or an S) provides information regarding the vulcanization properties, and the first number of the subsequent three-digit number provides information regarding the average particle size. However, this ASTM classification is very rough. Thus, within one ASTM classification range, considerably deviating viscoelastic properties of the tread compounds can occur.

DE 19 521 565 describes inversion carbon blacks which to a large extent satisfy the requirements of low rolling resistance and improved adhesion. These are carbon blacks for which the ratio $\tan \delta_0 / \tan \delta_{60}$ during incorporation into an SSBR/BR rubber compound satisfies the relation $$\tan \delta_0 / \tan \delta_{60} > 2.76 - 6.7 \times 10^{-3} \times CTAB,$$

and the value of $\tan \delta_{60}$ is always lower than the corresponding value for ASTM carbon blacks with identical CTAB surface area and 24M4-DBP absorption.

The carbon blacks according to DE 19 521 565 are manufactured according to the furnace carbon black method, which is used today to produce the overwhelming majority of the carbon blacks used in the tire industry. These methods were specially modified for the manufacture of the inversion carbon blacks.

The furnace carbon black method is based on the principle of oxidative pyrolysis; that is, the incomplete combustion of carbon black raw materials in a reactor which is coated with a highly fire-resistant material. As the carbon black raw material, so-called carbon black oils are used, but gaseous hydrocarbons can also be used alone or simultaneously with carbon black oil. Independently of the special construction design of the reactors, three zones can be distinguished in the carbon black reactor, which correspond to the different steps of the carbon black production. The zones are present successively along the reactor axis, and the reaction medium flows through them in succession.

The first zone, the so-called combustion zone, essentially comprises the combustion chamber of the reactor. Here a hot combustion chamber exhaust gas is generated, by burning a fuel, as a rule a hydrocarbon fuel, with an excess of preheated combustion air or other oxygen-containing gases. Natural gas is predominately used today as the fuel, but it is also possible to use liquid hydrocarbons such as heating oils. The combustion of the fuel usually occurs under conditions with an excess of oxygen. According to the book "Carbon Black" second edition, Marcel Dekker Inc., New York, 1993, page 20, it is very important, for the purpose of obtaining optimal use of the energy, that the conversion of the fuel to carbon dioxide and water occurs as completely as possible in the combustion chamber. In this process, the excess air promotes the complete conversion of the fuel. The fuel is usually introduced by means of one or more combustion lances into the combustion chamber.

The K factor is frequently used as an index number to characterize the excess air. The K factor is the ratio of the quantity of air required for the stoichiometric combustion of the fuel to the quantity of air which is in fact fed to the combustion. A K factor of 1 thus means that the combustion is stoichiometric. If there is an excess of air, the K factor is smaller than 1. Usually K factors of 0.3–0.9 are used.

In the second zone of the carbon black reactor, called the reaction zone, carbon black formation takes place. For this purpose, the carbon black raw material is injected and admixed in the hot combustion gas stream. With respect to the oxygen quantity which is not completely reacted in the combustion zone, there is an excess hydrocarbon quantity introduced into the reaction zone. Therefore, under normal conditions, carbon black formation starts here.

Carbon black oil can be injected into the reactor in different manners. For example, an axial oil injection lance, or one or more radial oil lances which are arranged on the circumference of the reactor, in a plane which is vertical with respect to the direction of flow, are suitable. A reactor can have several planes with radial oil lances along the direction of flow. At the tip of the oil lances, either spray or injection nozzles are provided, by means of which the carbon black oil is admixed in the combustion gas stream.

In the case of simultaneous use of carbon black oil and gaseous hydrocarbons, such as, for example, methane, as the carbon black raw material, the gaseous hydrocarbons can be injected separately from the carbon black oil through a special set of gas lances into the hot combustion gas stream.

In the third zone of the carbon black reactor, called the termination zone (quenching zone), carbon black formation is stopped by a rapid cooling of the carbon black-containing process gas. This process prevents any undesired secondary reactions. Such secondary reactions would lead to porous carbon blacks. The reaction is usually stopped by spraying in water using appropriate spray nozzles. Usually there are several points along the carbon black reactor for water spraying, for example, for "quenching" so that the residence time of the carbon black in the reaction zone can be varied. In an in-line heat exchanger, the residual heat of the process gas is used to preheat the combustion air.

Many different reactor forms have become known. The different variants concern all three reactor zones, but a particularly high number of embodiment variants exist for the reaction zone and the arrangement of injector lances for the carbon black raw material. Modem reactors usually have several oil injection lances, distributed around the circumference of the reactor and also along the reactor axis. The carbon black oil quantity, distributed over several individual streams, can be better admixed in the stream of hot combustion waste gases flowing out of the combustion chamber. By means of introduction points distributed spatially in the direction of the flow, it is possible to stagger the oil injection over time.

The primary particle size, and thus also the normally easily determinable specific carbon black surface area, can be controlled by the quantity of carbon black oil injected into the hot combustion gas. When the quantities and the temperatures of the waste gases generated in the combustion chamber are kept constant, the quantity of carbon black oil alone is responsible for the primary particle size, which relates to the specific carbon black surface area. Larger quantities of carbon black oil lead to coarser carbon blacks with lower specific surface areas than smaller quantities of carbon black oil. Simultaneously with a change in the quantity of carbon black oil, there is a change in the reaction temperature; since the sprayed carbon black oil lowers the temperature in the reactor, larger quantities of carbon black oil mean lower temperatures, and vice versa. From this it is possible to derive the relationship between the carbon black formation temperature and the specific carbon black surface area, in relation to primary particle size, which was described in the book "Carbon Black" cited above, on page 34.

If the carbon black oil is distributed from two different injection points, which are separately located along the reactor axis, then, in the first upstream location, the quantity of residual oxygen still contained in the combustion chamber waste gas is still in excess with respect to the sprayed carbon black oil. Thus, carbon black formation occurs at this point with a higher temperature compared to the subsequent carbon black injection points, that is, in the first injection point, the formed carbon blacks have finer particles, and present a higher specific surface area, than at a subsequent injection point. Each additional injection of carbon black oils leads to additional temperatre drops and to carbon blacks with larger primary particles. Carbon blacks prepared in this manner thus present a widening of the particle size distribution curve and, after incorporation in a rubber, they present a different behavior than carbon blacks with a very narrow monomodular particle size spectrum. The wider particle size distribution curve leads to a lower loss factor of the rubber compound, that is to a low hysteresis, and therefore the expression low-hysteresis (lh) carbon blacks is used. Carbon blacks of this type, or methods for their manufacture, have been described in the European Patents EP 0,315,442 and EP 0,519,988.

The conventional methods are thus able to produce, by means of the spraying devices for carbon black oil positioned at intervals along the reactor axis, carbon blacks with a wider particle size distribution curve, which impart a lower rolling resistance to rubber compounds in which they have been incorporated.

For the manufacture of the inversion carbon blacks, the fiace carbon black method was modified in another manner. Whereas the conventional furnace carbon black methods are intended to obtain as complete a combustion as possible of the fuels in the combustion chamber, and more particularly in the combustion zone, the method according to DE 195 21 565 for the manufacture of inversion carbon blacks is based on the formation of hydrocarbon nuclei as a result of the incomplete combustion of the fuel in the combustion zone. The nuclei are then tranported with the hot waste gas stream into the reaction zone, where a nucleation-induced carbon black formation is initiated with the added carbon black raw material. The intended incomplete combustion of the fuel, however, does not mean that the fuel is burned in a less than stoichiometric amount of oxygen. Rather, the method according to this invention also stats with an excess of air or oxygen-containing gases in the combustion chamber. As with conventional carbon blacks, K-factors of 0.3–0.9 can be used in this process.

In order to generate carbon black nuclei in spite of the excess air, different routes can be engaged according to DE 195 21 565. In a preferred variant of the method, liquid hydrocarbons are used as the starting fuel, which are then burned instead of natural gas in the combustion chamber of the reactor with an excess of air or oxygen-ontaining gases. Liquid hydrocarbons burn more slowly than gaseous hydrocarbons, because they first must be converted into the gaseous form, that is they must be vaporized. In spite of an excess of oxygen, liquid hydrocarbons can therefore be not only burned, but also used for the production of hydrocarbon nuclei which—if sufficient time is available and the temperature is sufficiently high—also burn, or they can grow to form larger carbon black particles if a rapid cooling is applied. The nucleation induced carbon black formation is based on the fact that the nuclei which are formed during the combustion of liquid hydrocarbons with an excess of oxygen are immediately brought in contact with the carbon black oil, and thus nucleus growth is initiated.

An additional variant of the method according to DE 195 21 565 uses natural gas as the fuel. Nucleation is achieved by selecting an outflow rate for the gas out of the combustion lance(s) which is so low that a poor admixture of the natural gas in the hot stream of combustion air is intentionally achieved. It is known that carbon black nuclei form in cases of poorly mixed flames, and the term luminous flames is used because of the lighting up of the particles which form. In this procedure, as in the combustion of liquid hydrocarbons, it is important for the formed nucleus to be brought into contact, immediately with their formation, with the carbon black oil. If one uses a larger combustion chamber, or combustion zone, to effect the conversion of the nuclei with the oxygen present in excess in the combustion zone, one thereby allows a complete combustion in the combustion zone of the carbon black reactor, and thus no nucleation-induced carbon black formation occurs.

Both described variants can also be combined. In that case, the liquid hydrocarbons and the natural gas, or other gaseous components, are simultaneously fed in appropriate ratios into the combustion zone. It is preferred to use oils, for example, the carbon black oil itself, as the liquid hydrocarbon.

The method according to DE 195 21 565 thus resides in using liquid and/or gaseous hydrocarbons as fuels in the combustion zone, in which the oxygen, with respect to the hydrocarbons used, is present in excess. This ensures that carbon black nuclei are formed, for example, due to the insufficient residence time of the liquid hydrocarbons or due to an insufficient mixing of the gaseous hydrocarbons with the combustion air. These carbon black nuclei are then brought into contact in the reaction zone, immediately after their formation, with the carbon black raw material, which is used in excess with respect to the quantity of oxygen. Cooling of the resulting carbon black reaction gas mixture follows, by the introduction through nozzles of water into the termination zone, and the further processing of the carbon black so formed in the usual manner.

According to DE 195 21 565, the fuel plays an important role in carbon black formation; it is referred to as the primary carbon black raw material below. The carbon black raw material which must be admixed in the reaction zone is accordingly referred to as the secondary carbon black raw material, and, in terms of quantity, it accounts for the majority of the carbon black which forms.

The inversion carbon blacks according to DE 195 21 565 impart to the carbon black mixture, compared to conventional carbon blacks, a reduced roling resistance and a comparable adhesion under wet conditions. Furthermore, ATM (atomic force microscopy) examinations revealed that the inversion carbon blacks present a significantly rougher surface than the corresponding standard ASTM carbon blacks, which results in an improved binding of the rubber polymers to the carbon black particles (see W. Gronski et al., "NMR Relaxation, A Method Relevant for Technical Properties of Carbon Black-Filled Rubbers, International rubber conference 1997, Nuremberg, page 107). The improved binding of the rubber polymer leads to a reduction in the rolling resistance.

Examinations concerning the abrasion of rubber compounds using inversion carbon blacks have shown that these carbon blacks impart to the rubber compounds an improved abrasion resistance with lower exposure to loads. In the case of high loads, for example in truck tires, these rubber compounds present an increased abrasion.

An object of the present invention, therefore, is to provide improved inversion carbon blacks which are characterized particularly by a reduced abrasion under high loads.

SUMMARY OF THE INVENTION

The present invention relates to improved inversion carbon blacks as well as a method for their manufacture. More specifically, the invention relates to furnace carbon blacks with CTAB values of 20–190 $m^2/g$ and 24M4-DBP absorptions of 40–140 ML/100 g, with a ratio tan $\delta_0$/ tan $\delta_{60}$ which, during incorporation in an SSBR/BR rubber compound, satisfies the relation $$\tan \delta_0 / \tan \delta_{60} > 2.76 - 6.7 \times 10^{-3} \times CTAB,$$

where the value of tan $\delta_{60}$ is always lower than the value for ASTM carbon blacks with the same CTAB surface area and 24M4-DBP absorption. This carbon black is thus characterized in that the distribution curve of the particle diameter sizes of the carbon black aggregate has an absolute slope of less than 400,000 $nm^3$. The improved inversion carbon blacks have a smaller rolling resistance with identical or improved wet sliding behavior. The particle size distribution contains a smaller proportion of particles with large diameters, which leads to an improved abrasion behavior of rubber compounds prepared using these carbon blacks. These inversion carbon blacks can be manufactured in conventional carbon black reactors by controlling the combustion in the combustion chamber in such a manner that carbon black nuclei form, which are immediately brought into contact with the carbon black raw material. The carbon blacks of the invention present a lower proportion of larger particles if the additions of combustion air and carbon black raw material are increased in an appropriate manner.

BRIEF DESCRIPTION OF THE DRAWINGS

The present invention will be further understood with reference to the drawings, wherein:

FIG. 4 is a model of bound number on a rough carbon black surface illustrating the three length scales which can be distinguished in NMR experiments.

FIG. 5 illustrates surface models of conventional and of nano-structure carbon blacks.

INTODUCTION TO THE TECHNOLOGY OF THE INVENTION, THE ART AND THE INDUSTRY

Figure 1:
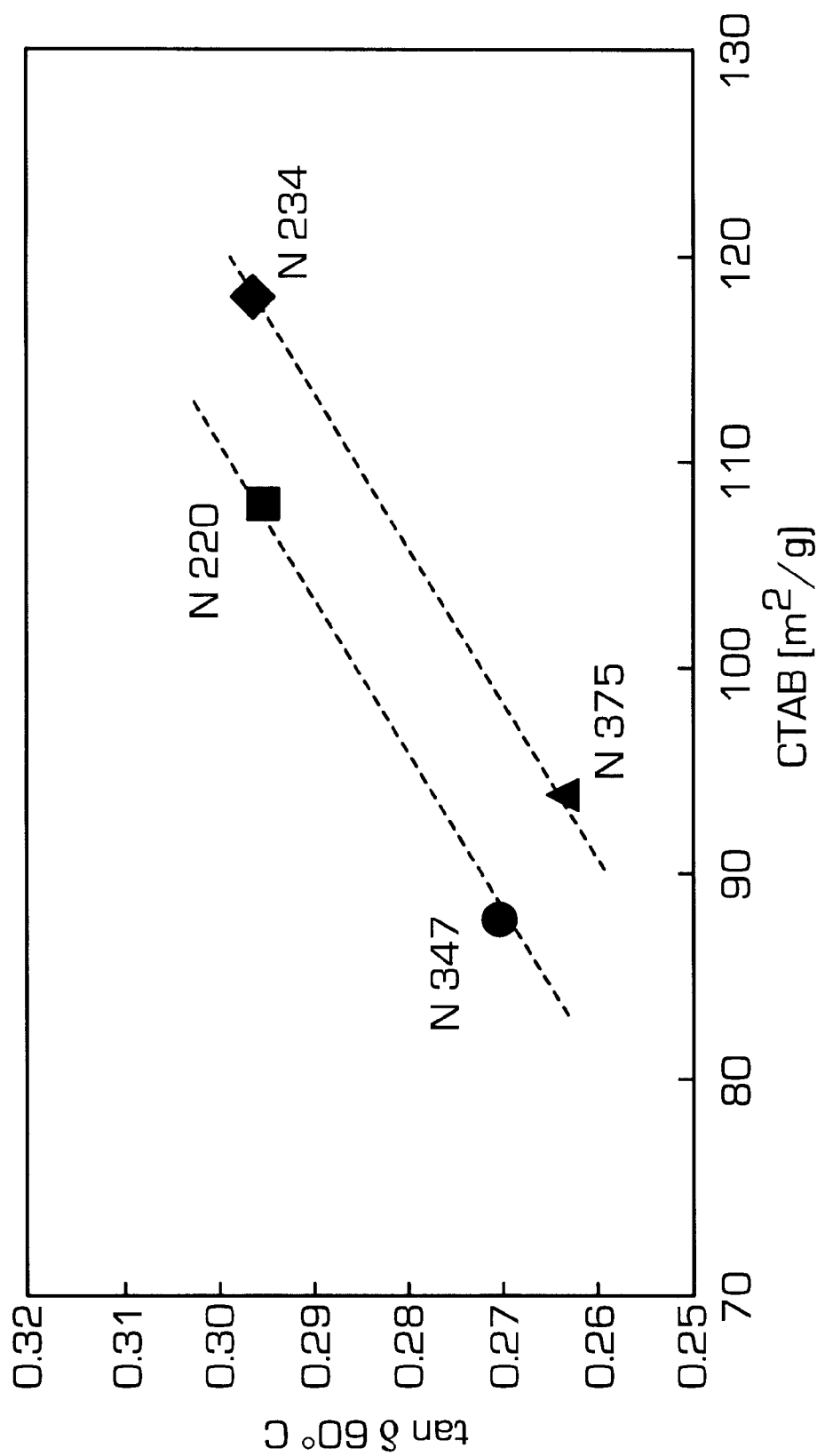
FIG. 1 is a graph plotting values of tan $\delta$ 60° C. of improved and non-improved carbon blacks with respect to the CTAB values.

Nano-structure blacks (carbon blacks of the invention) are a new carbon black family produced by physical surface modification in a furnace reactor. Various grades with altered specific surface areas and structure levels are available. A main characteristic of these novel blacks is an unusually rough surface which leads to enhanced interaction forces with rubber polymers. Due to a narrow aggregate size distribution with limited amounts of large aggregates, not only hysteresis (heat build-up) but also treadwear is improved compared to conventional blacks. This makes nano-structure blacks particularly suitable for usage in truck tire applications.

Over the last few years, much has been done in the tire industry to improve passenger tire tread compounds. In particular, the introduction of silicas, together with silane coupling agents, has overcome traditional conflicts in properties like rolling resistance and wet traction. Such filler solutions have become state of the art in certain passenger car tires which tolerate the higher raw material and processing costs. It seems that most of the work with regard to passenger tires has been completed, and truck tires are now moving progressively into the focus of development activities. However, in truck tire treads, the usage of natural rubber is compulsory, and so a straightforward transfer of the passenger tire silica solution is not possible.

The key properties of a truck tire are treadwear and rolling resistance, so our task was to develop cost effective filler solutions enabling improvements in this field.

Due to heavy load and relatively slow driving speed, the fuel consumption of trucks considerably depends on tire rolling resistance. Any improvements here are very much welcome, and fleet owners who carefully monitor fuel consumption as one of their major expenses request low rolling resistance tires. Fuel consumption alone contributes up to about 60% of overall truck operating costs. It is obvious that a reduction in rolligre istance, and in particular of the numerous trailer tires, has a very significant impact on fleet owners' profitability.

In contrast to passenger car tires, where tread contributions dominate, in a truck tire, the belt compound, the carcass, the bead and the sidewall also play an important role. It is clear therefore that truck tire rolling resistance optimization means individual optimization of all of these components. However, any advantage in fuel economy must not jeopardize treadwear, i.e., the service life of the high quality tires. In fact, improvements in treadwear are equally as important as improvements in rolling resistance, because higher mileage is also an important sales feature. In many countries, continuously increasing tire loads and engine powers fuel the need for improvements in tire treadwear.

After a long period of relative stability in carbon black performance technology, the new nano-structure black family is now being introduced to the market. Several grades are tailor-made to fulfill current truck tire filler demands as discussed above. With these new carbon blacks, outstanding hysteresis properties (low heat build-up) and additionally improved treadwear can be achieved.

Development Strategy and Characterization

Basically, three development stages have led to a steady increase in the performance of furnace blacks since the introduction of this technology in the fifties. After having learned to vary primary particle size (specific surface area) and structure in the sixties, the last major innovation step in furnace blacks technology was the invention of the so called "improved process" in the early seventies. At equal specific surface area and structure, usage of these blacks led to 6–8% improvements in tire treadwear, and slightly reduced hysteresis.

Since then, carbon black users have seen various new grades, but no real further performance jumps, because improvements in one property always led to disadvantages in another. Only recently have some interesting but expensive chemically modified blacks been suggested. The nano-structure concept according to the present invention is unique in that it uses physical surface modification rather than chemical surface modification in the reactor, which is very cost effective. Taking into account the easy application—since conventional blacks may simply be exchanged without changes in formulation or processing conditions—nano-structure blacks offer an excellent cost/performance ratio.

The starting point for nano-structure development was the so-called "improved technology." The name itself suggests that this effect cannot be attnbuted to a single carbon black parameter. Empirically, a new test—tinting strength—was introduced to be able to characterize these blacks. The tint depends on primary particle size, structure, porosity and additionally on aggregate size distribution (asd), the latter being narrowed in the short quench improved process. The tint characterization has the disadvantage that it looks at a typical, but only secondary, parameter of these blacks. No direct link between the tinting strength and the improved reinforcement can be made. In particular, a narrow aggregate size distribution does not offer any explanation for the lower hysteresis of improved blacks, which is illustrated in FIG. 1 (the values of which are average results from 6–8 individual tests). This finding conflicts with frequent literature statements relating a broad asd with low hysteresis. Very likely, asd is only a secondary parameter without any clear impact on hystersis. The improved effect must be related to a higher number and strength of reactive sites at the carbon black surface, which enhance the carbon black polymer interaction See H. Wolf and S. Wolff, Kautsch. Gummi, Kunstst. 43, 1082 (1990), which is incorporated herein by reference. However, a discriminative yet simple test has still been missing.

Starting with the improved technology, our target was to further increase polymer interaction and thus further improve hysteresis and treadwear. This development has been carried out in modified furnace reactors purely by physical means without adding chemicals.

To characterize and to understand the unique nano-structre blacks, more sophisticated analytical tools have to be applied. Most helpful in this respect is the usage of scanning tunneling microscopy (STM), atomic force microscopy (AFM) and transversal $^1$H NMR relaxation spectroscopy.

STM and AFM allow the direct investigation of the carbon black surface morphology at resolutions down to the nm level. A direct three-dimensional representation of the surface is thus obtained.

Figure 2:
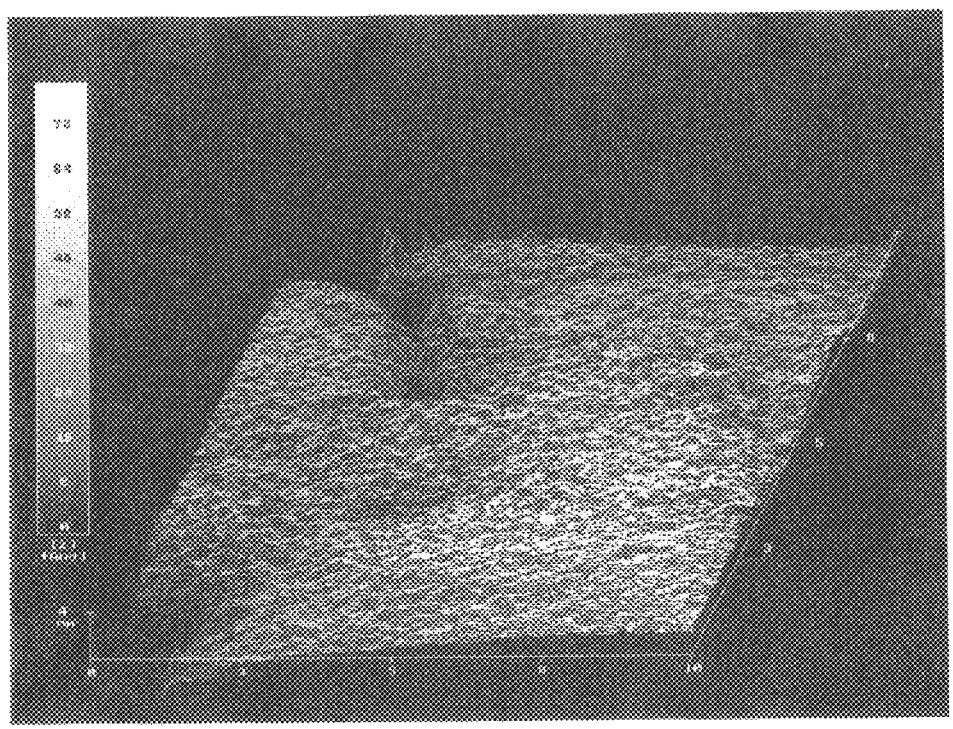
FIGS. 2 and 3 illustrate at a high level of magnification (scan area: 10×10 nm2) the micro-structure of the surface of the conventional carbon black ASTM grade N 356, and of the surface of the nano-structure black EB 167, respectively.
Figure 3:
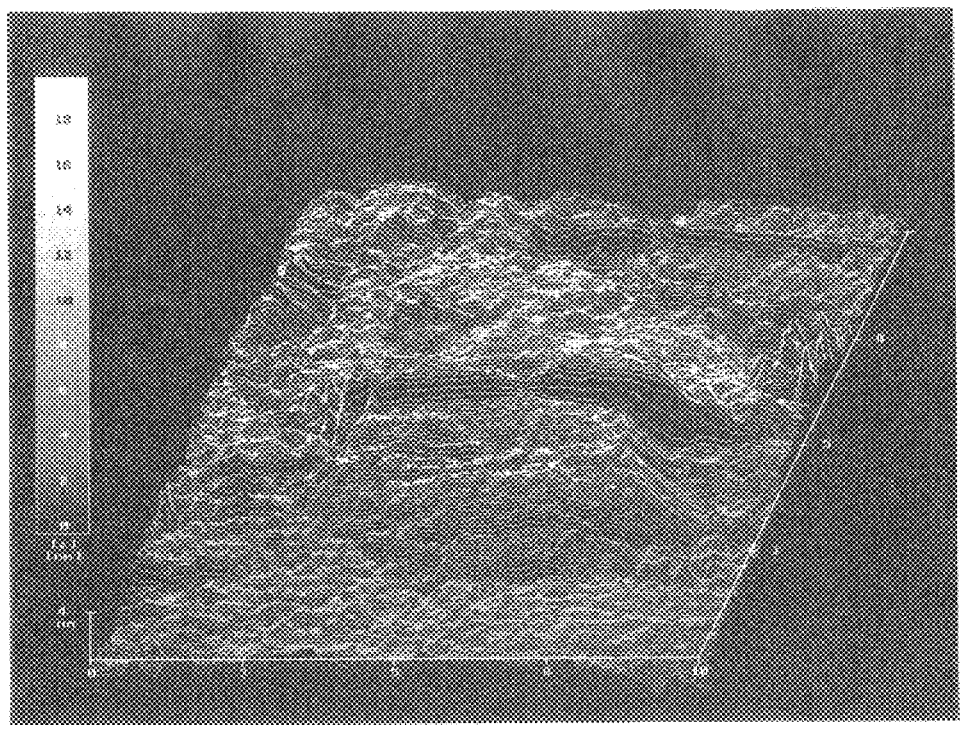

In FIGS. 2 and 3, the typical results of such investigations are displayed. These pictures illustrate at a high level of magnification (scan area: 10×10 nm2) the micro-structure of the surface of the nano-structure black EB 167 (FIG. 3), and the conventional ASTM grade N 356 FIG. 2). The interpretation of these investigations is as follows: the surface of a primary carbon black particle consists of a multitude of small graphite-like crystallites, see, e.g., W. Niedermeier, J. Stierstorfer, S. Kreitmeier, O. Metz and D. Göritz, *Rubber Chem. TechnoL* 67, 148 (1994); W. Niedermeier, H. Raab, J. Stierstorfer, S. Kreitmeier and D. Göritz, *Kautsch. Gummi, Kunstst.* 47, 799 (1994); and J. Fröhlich, S. Kreitmeier and D. Göritz. *Kautsch. Gummi, Knstst.* 51, 370 (1998). Conventional and nano-structure blacks exhibit characteristic differences in crystallite sizes and surface roughness. The graphite crystallites of EB 167 are smaller, with an average size of only 1.1 nm in length, in contrast to 1.6 nm for the N 356, and additionally are arranged in a more irregular or turbostratic fashion. These results are in line with the one obtained for EB 111 (average value 0.7 nm) and N 220 (average value 1.2 nm), see B. Freund and F. Forster, *Kautsch. Gummi, Kunstst.* 49, 774 (1996); and W. Niedermeier and B. Freund, Tire Technol. Intern., 32 (1998).

Both factors, then, the crystallite size and the geometrical arrangement of the crystallites, influence the surface roughness of a primary particle.

Transversal 'H NMR relaxation spectroscopy has been used as a tool to analyze the interaction between rubber polymer and carbon blacks, see H. Lüchow, E. Breier and W. Gronski, *Rubber Chem. Technol.* 70, 747 (1996). It has been shown that polymers adsorb better on rough surfaces than on smooth ones, see J. F. Douglas, *Macromolecules* 22, 3707 (1989); and G. Heinrich and T. A. Vilgis, *Rubber Chem. Technol.* 68, 26 (1995). The relaxation measurement of the bound rubber shell of carbon black loaded elastomers can be separated into three relaxation regimes corresponding to mobile loosely bound rubber, a rubber fraction which is immobilized on the carbon black surface, and a third component of intermediate mobility. Based on the work of Sotta et al, the relaxation times can be related to the distance between two entanglements or between two polymer segments adsorbed on the carbon black surface, see P. Sotta, C. Fülber, D. E. Demco, B. Blümich and H. W. Spiess, *Macromolecules* 29, 6222 (1996).

Three different polymer length elements can be distinguished, as depicted in FIG. 4, which correspond to three different relaxation times of the polymer bound to a rough carbon black surface. These three relaxation regimes represent the mobile matrix polymer ($f^3$, labeled 3 in FIG. 4), a polymer component ($f^2$, labeled 2 in FIG. 4) which has an intermediate mobility, and a third, immobilized component ($f^1$, labeled 1 in FIG. 4) which is firmly attached to the carbon black surface.

In accordance with Sotta, infra, the relaxation time T2.2 of the intermediate component is related to the average end-to-end distance of polymer segments between adsorption sites on the carbon black surface. For the N 220 black, a distance of approximately 2 nm is obtained. This value is very close to characteristic dimensions of the crystal morphology and roughness of carbon black surfaces determined by AFM and STM.

Table 1 shows the results of such NMR measurements: $f^1$ is the immobilized part, $f^2$ the part with intermediate mobility, and $f^3$ the mobile matrix part of the polymer. All measurements were carried out at 300 K using SBR 1500 as polymer component.

TABLE 1

NMR results of three nano-structure blacks and corresponding ASTM grades.

| Sample | $T_{23}$ [μs] | $T_{22}$ [μs] | $T_{21}$ [μs] | $f_3$ | $f_2$ | $f_1$ |
|---|---|---|---|---|---|---|
| N 220 | 184 | 94 | 22 | 0.59 ± 0.01 | 0.19 ± 0.01 | 0.20 ± 0.01 |
| EB 111 | 188 | 108 | 24 | 0.57 ± 0.01 | 0.15 ± 0.01 | 0.27 ± 0.01 |
| N 234 | 200 | 85 | 19 | 0.67 ± 0.01 | 0.17 ± 0.01 | 0.15 ± 0.01 |
| EB 136 | 188 | 83 | 16 | 0.62 ± 0.01 | 0.20 ± 0.01 | 0.16 ± 0.01 |
| N 339 | 191 | 89 | 17 | 0.64 ± 0.01 | 0.17 ± 0.01 | 0.17 ± 0.01 |
| EB 137 | 187 | 109 | 18 | 0.56 ± 0.01 | 0.20 ± 0.01 | 0.22 ± 0.01 |

The loosely bound polymer ($f^3$) is the largest component. This fraction is smaller for all experimental blacks EB 111, EB 136 and EB 137 than for the corresponding conventional blacks N 220, N 234 and N 339. The differences between nano-sucture and conventional blacks are outside the estimated error intervals and are significant.

The immobilized faction of the polymer ($f^1$) is larger for all samples containing the experimental blacks than for the coonding conventional blacks indicating a higher adsorption strength for these special grades. This observation is in agreement with theoretical predictions that adsorption forces increase on rough surfaces.

Figure 6:
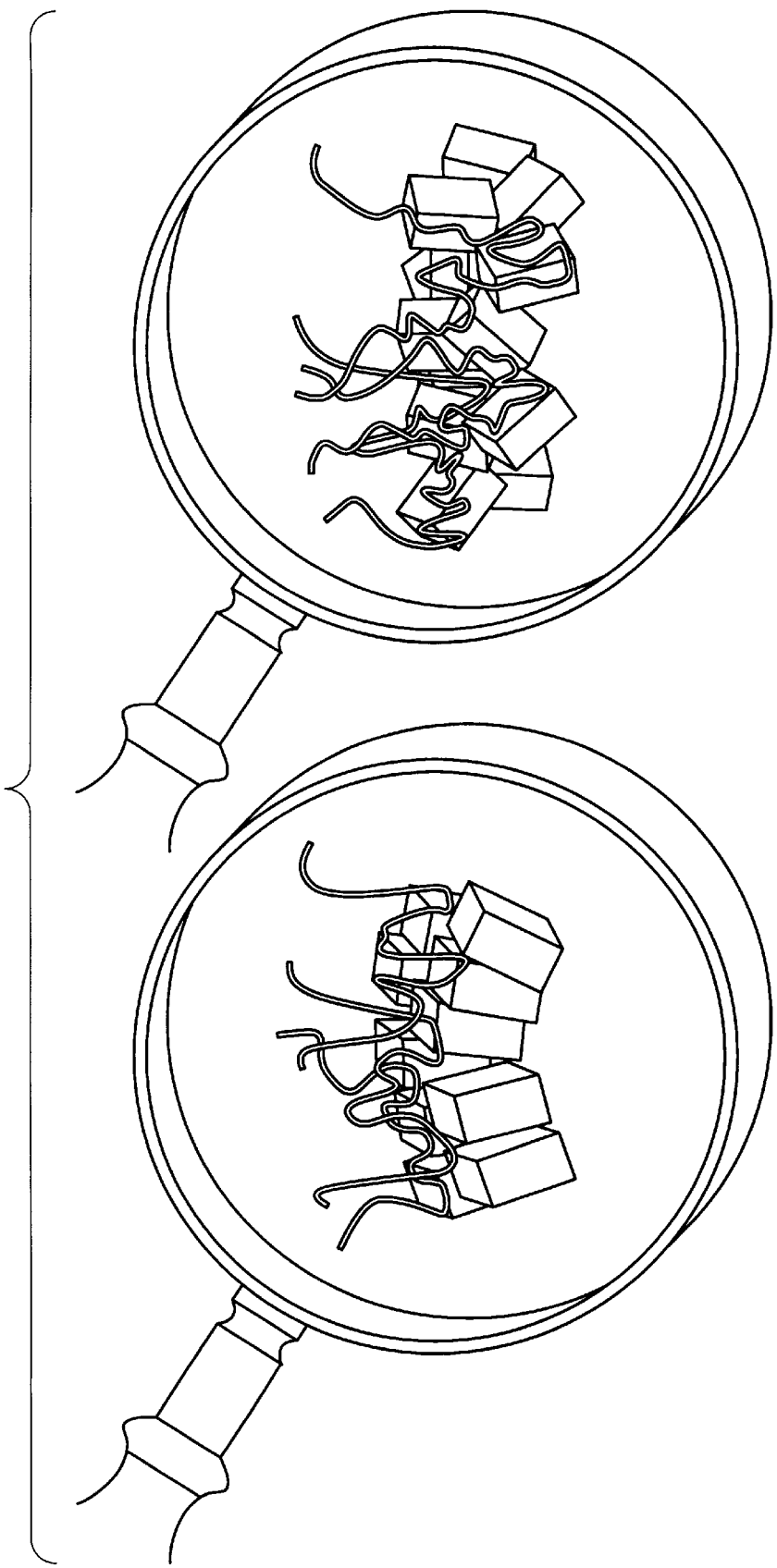
FIG. 6 illustrates models showing the higher number of adsorbed segments on a rough surface versus a smooth one.

Both independent characterization methods STM and AFM as well as transversal 'H NMR relaxation spectroscopy result in an unusually high surface roughness of the nano-structure blacks. From these measurements, a surface model for nano-structure blacks can be derived, which is shown in FIGS. 5 and 6. The disordered cubic blocks represent small graphite-like crystallites. The smooth surface of the conventional black, which predominantly consists of flat low surface energy basal planes, gives comparatively weak mechanical/physicochemical interactions with the polymer chains. In contrast the rough surface of a nano-structure black with numerous edges and ledges, which are the active sites with a particularly high surface energy, leads to strong mechanical/physicochemical interactions with the polymer. Even simple physical models suggest that the number of polymer-surface interactions is strongly enhanced with increasing surface roughness. This is a consequence of the higher probability for polymer segments to be in contact with the polymer surface. Or in other words, the entropic hindrance for multiple polymer segment attachments is smaller if the surface is rough. Consequently, polymer chains are tightly bound on the rough nano-structure surface and do not easily move. Slippage of polymer molecules along the carbon black surface, which is the major hysteresis mechanism in filled vulcaniates, is hindered and hysteresis (tan δ 60° C.) lowered.

The Marketplace Approach

Figure 7:
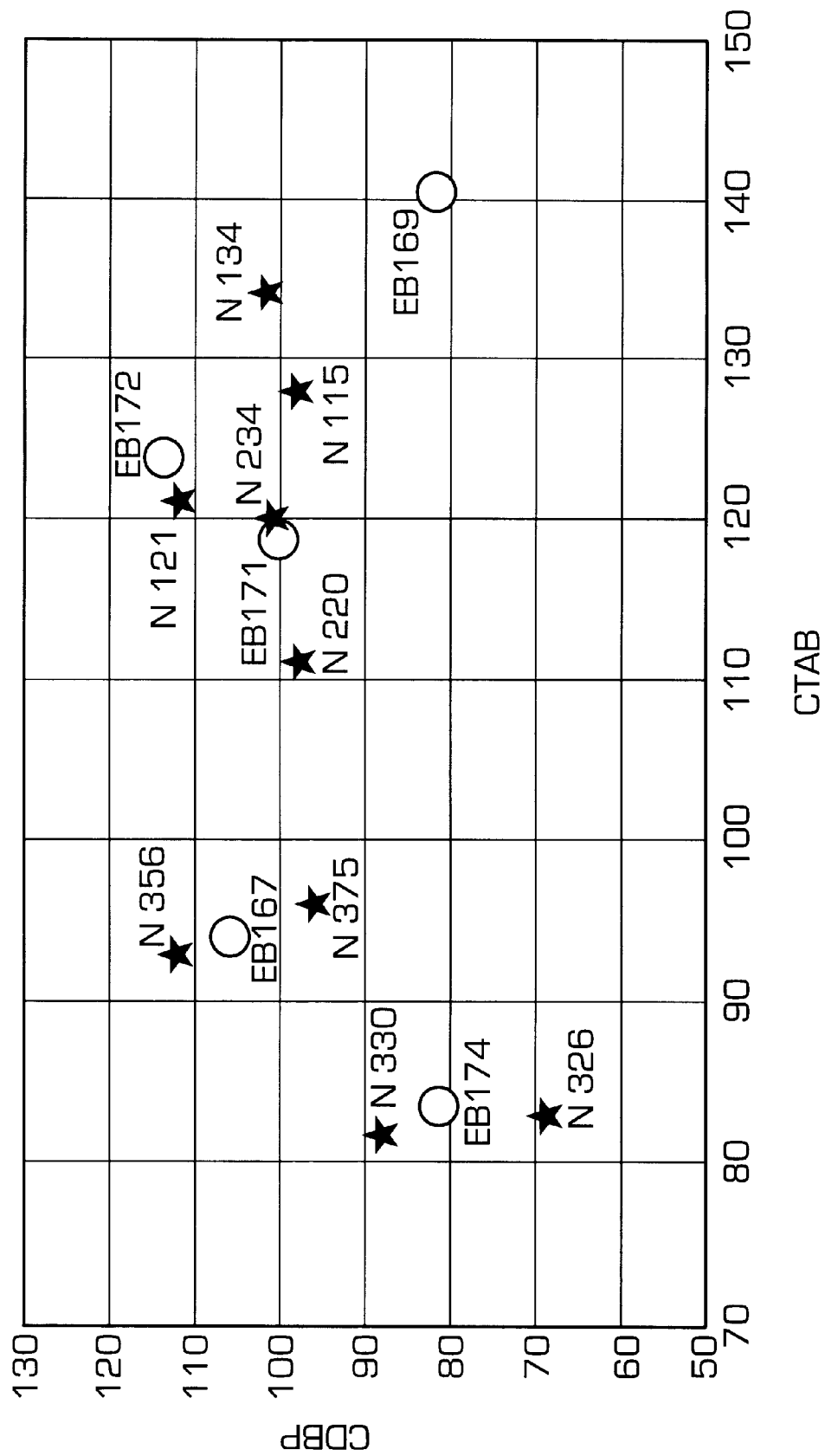
FIG. 7 is analytical data of a number of nano-structure carbon blacks, with the CDBP plotted versus the CTAB values.

FIG. 7 gives an overall view of the analytical data of the presently available nano-structure grades investigated in the introductory portion of this study. Some of these new blacks don't differ in their analytical data with respect to well known ASTM blacks; others are new grades.

Typical applications for these new carbon black grades are:

EB 167 (N 356-type): high structure black particularly suited for super single trailer tire treads EB 169 (new type): designed for outstanding tearwear and low chipping and chunking EB 171 (N 234-type): suited for tread compounds of passenger as well as track tires EB 172 (N 121-type): suited for tread compounds of passenger as well as truck tires EB 174 (N 326-type): designed for usage in body compounds like carcass and belt In-rubber Properties A typical truck tread formulation in which all blacks have been tested is shown in Table 2. The compounds were mixed in a 3.61 Banbury mixer using a three stage mixing process. Curing time was 20 minutes at 150° C.

TABLE 2

NR test formulation
Test formulation

| | |
|---|---|
| RSS 1 mast. | 100 |
| Carbon black | 52 |
| ZnO RS | 3 |
| Stearic acid | 3 |
| 6 PPD | 1 |
| TMQ | 1 |
| WAX | 1 |
| Retarder CTP | 0.15 |
| TBBS | 1 |
| Sulfur | 1.5 |
| Cure: t 95%/150 ° C. | |

Figure 8:
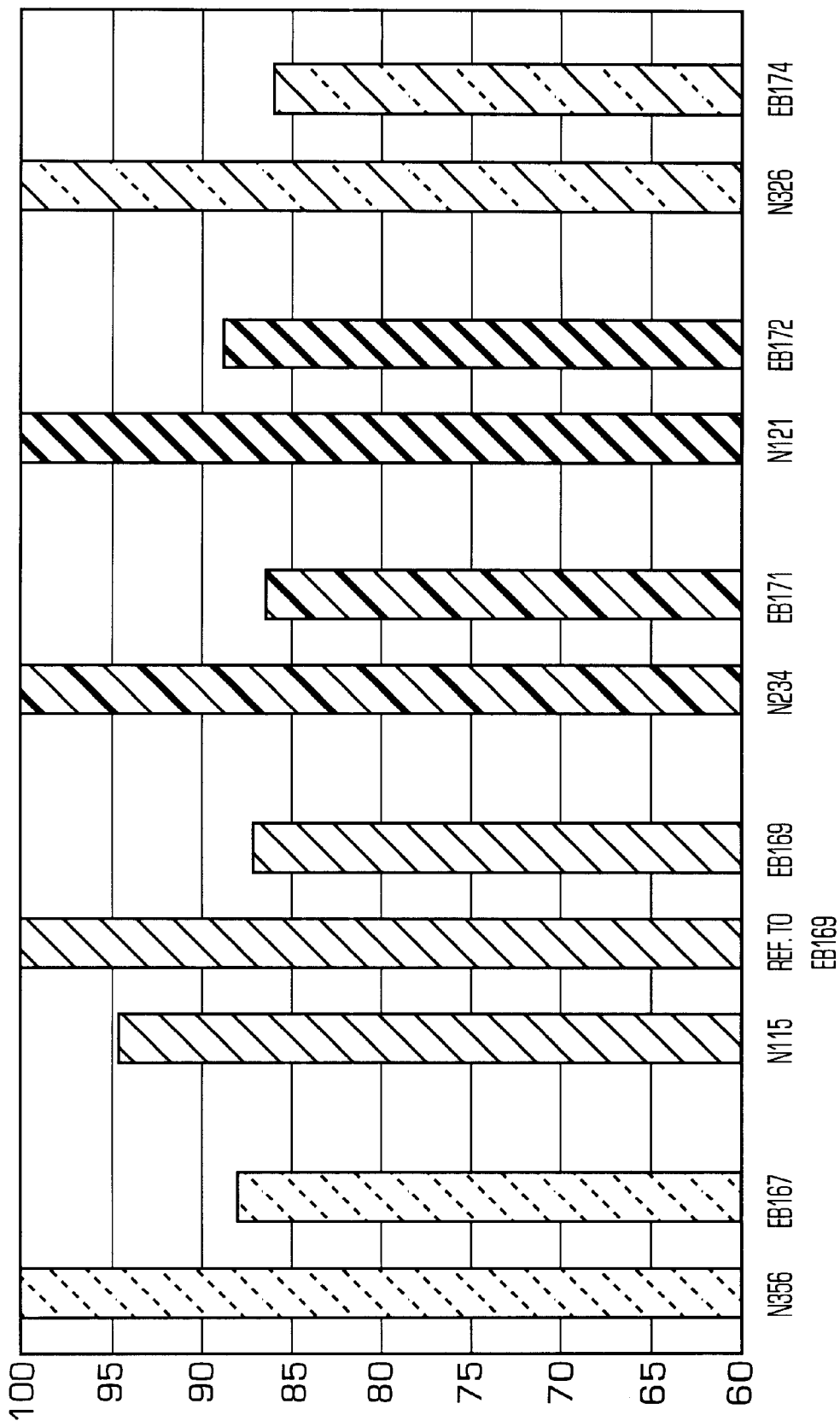
FIG. 8 is a graph of tan $\delta$ 60° C. ratings of nano-structure blacks and corresponding conventional carbon blacks.
Figure 9:
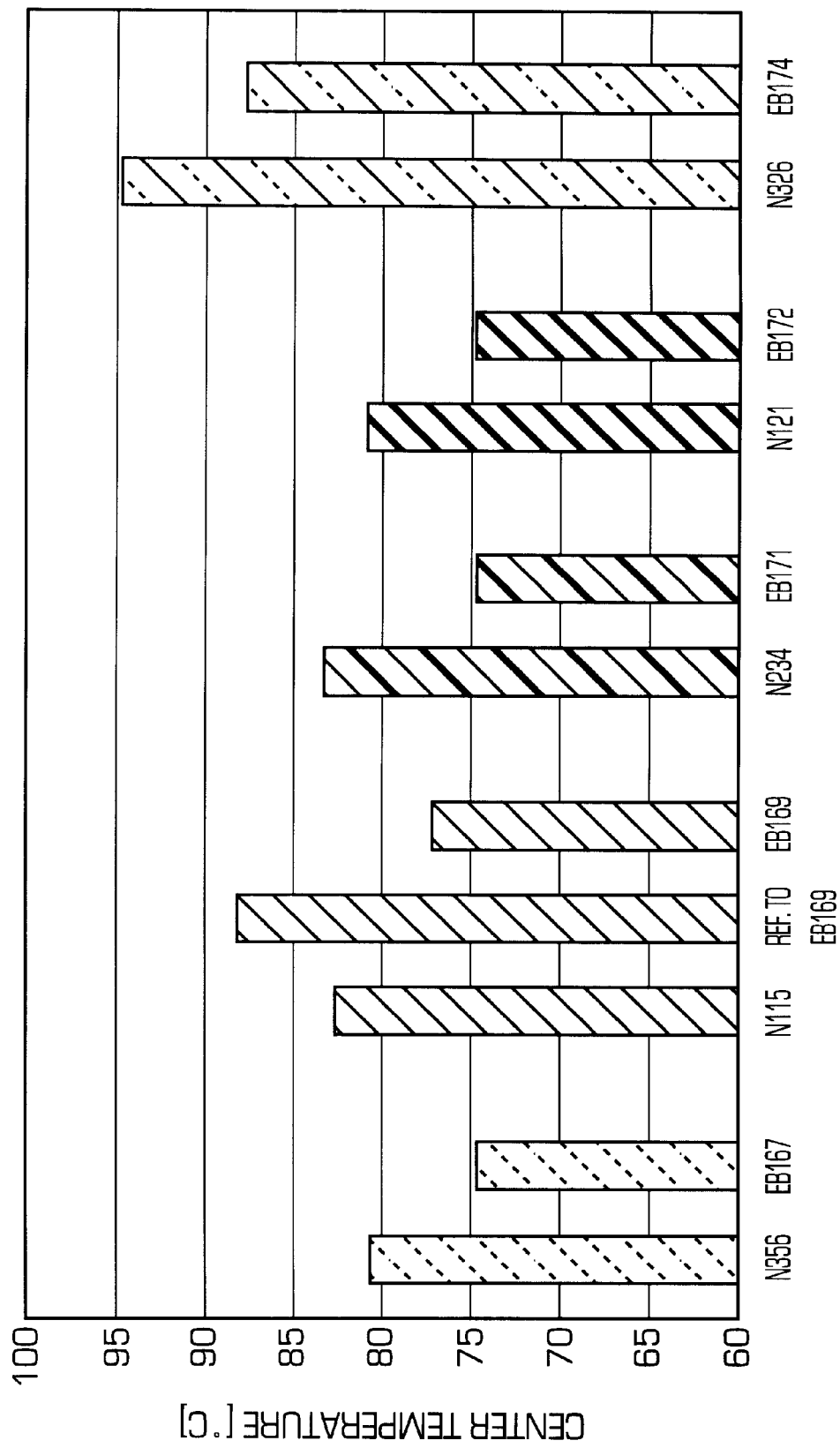
FIG. 9 is a graph of Goodrich flexometer test values for the carbon blacks of FIG. 8.

FIG. 8 provides tan δ 60° C. results of nano-structure grades in comparison with corresponding conventional and ASTIM blacks. At equivalent hardness and stress-strain properties all nano-structure blacks give tan δ 60° C. reductions of 12 to 14 per cent relative to their reference. The lower hysteresis values also translate into remarkably lower heat build-ups as shown in FIG. 9.

EB 169, e.g., despite its higher CTAB value of 140 m2/g compared to the 128 m2/g of N115, gives a flexometer center temperature of only 104° C., which is 12° C. lower than N115. At the same time, tread wear and chipping and chunking properties are noticeably improved.

Figure 10:
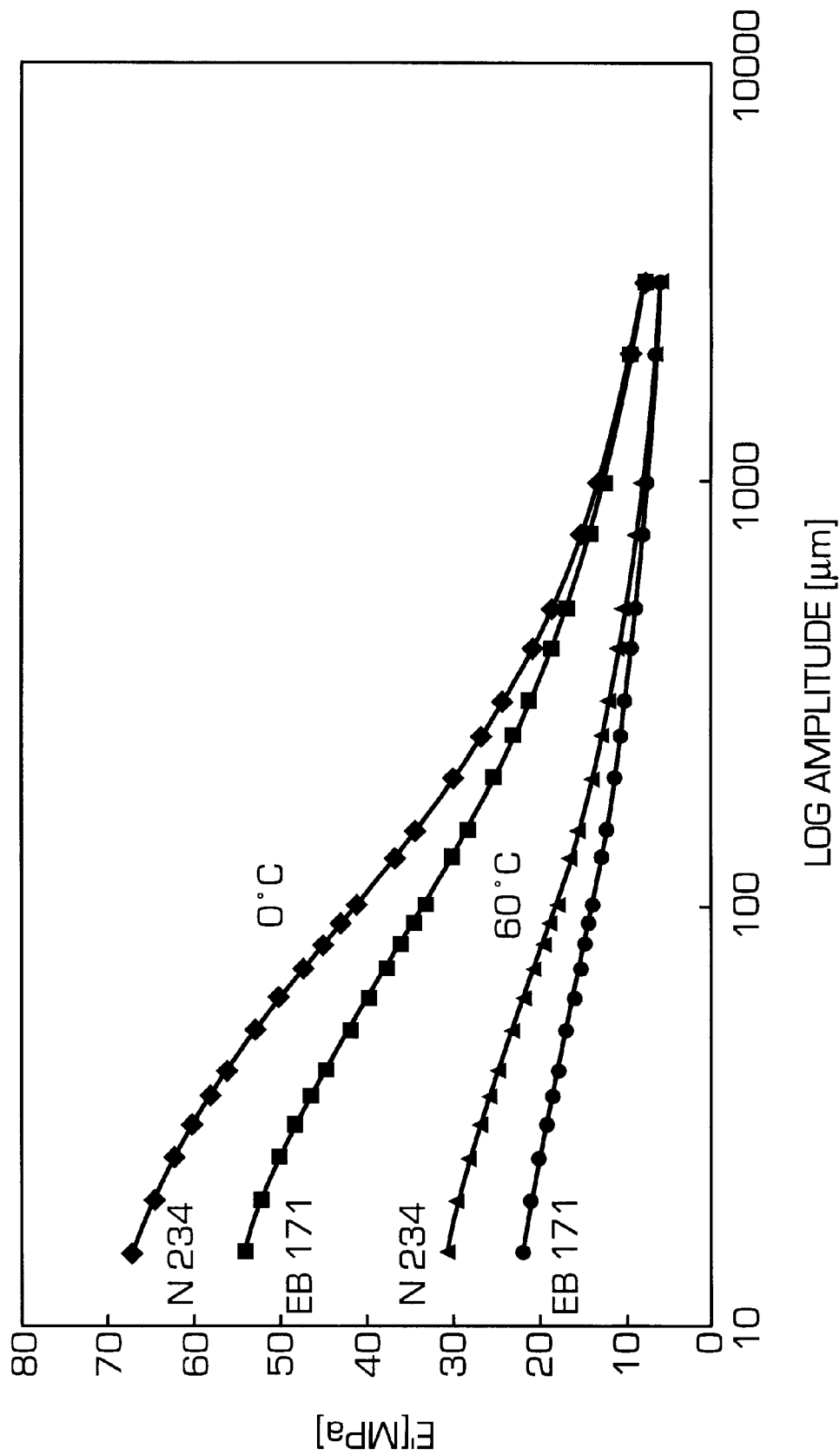
FIGS. 10 and 11 are plots of train dependencies of E* at 0° C. and 60° C. measured at 5 Hz of various carbon blacks with respect to log amplitude.
Figure 11:
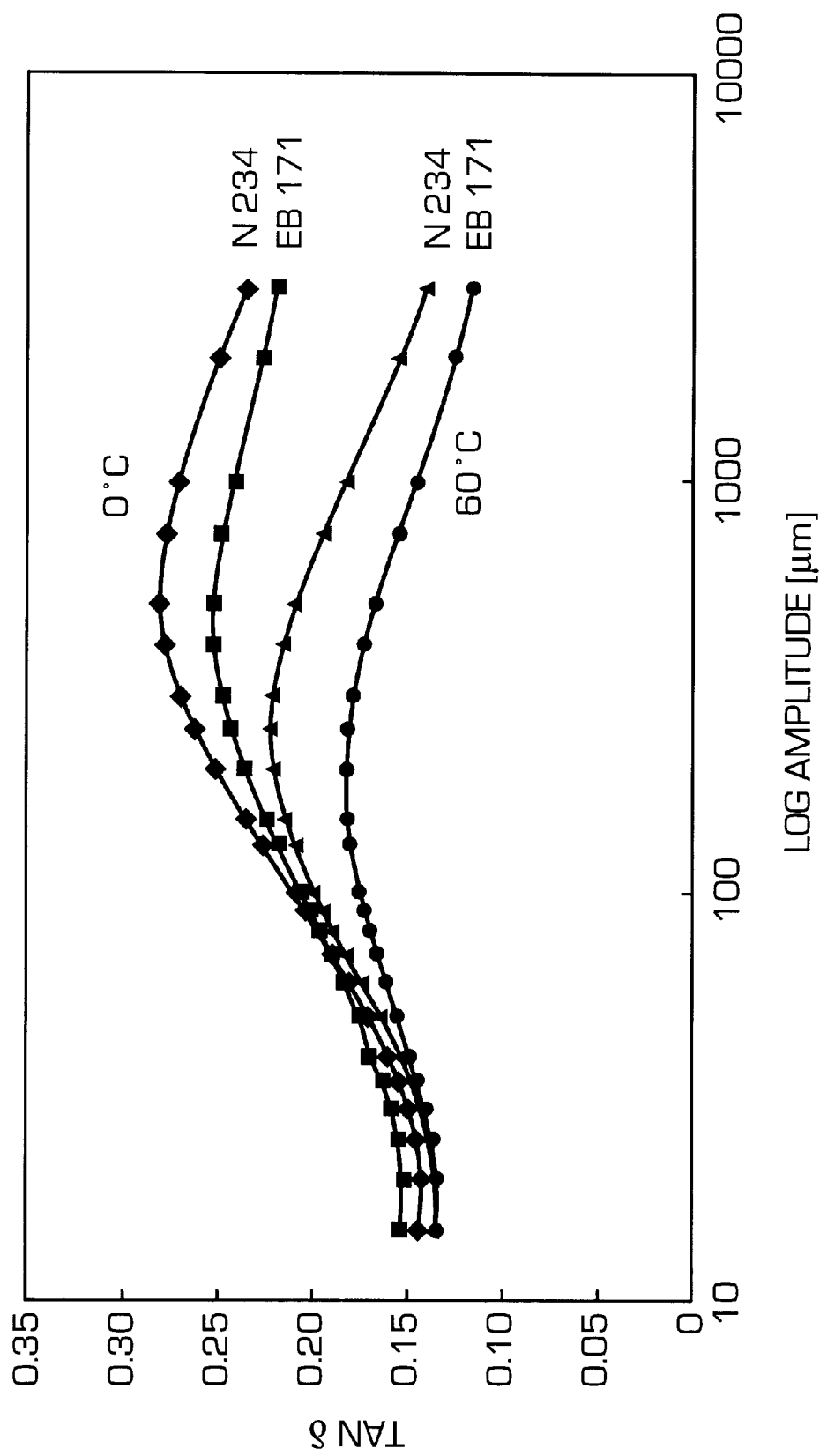

In summary, then, nano-structure blacks are characterized by superior rolling resistance and lower heat build-up. Theory suggests that the low hysteresis nano-structure blacks should also give lower dynamic stress softening with increasing strain amplitudes (lower Payne effect), see P. Maier and D. Göritz, *Kautsch. Gummi, Kunstst.* 49, 18 (1996); and B. Freund and W. Niedeimeier, *Kautsch. Gummi, Kunstst.* 51, 397 (1998). The number of polymer chains, which are only weakly adsorbed and slip along the carbon black surface with increasing strain amplitude, is lowered due to the enhanced adsorption power of these novel blacks. This is confirmed in FIG. 10, which shows Payne measurements for EB 171 and N 234 at two temperatures. The strain amplitude dependence of the corresponding loss tangent can be seen in FIG. 11. EB 171 gives clearly lower hysteresis results compared to the conventional ASTM black N234.

In the literature, carbon black hysteresis is frequently but only empirically related to a broad aggregate size distribution with significant amounts of large aggregates. At the same time, it is known that this fraction of large aggregates deteriorates treadwear, especially under high severity driving conditions. Broad asd blacks have consequently only found limited market interest. A prime target in the present development was therefore to limit the amount of large aggregates while maintaining the beneficial dynamic properties and thus demonstrate that the empirical hysteresis/asd correlation is no longer valid In Table 3, fractions of aggregates larger than 150mn and tan δ 60° C. reductions relative to N 234 are given for several carbon black samples. It can be seen that at equal CTAB surface areas and CDBP structures the tan δ reduction remains nearly unchanged whereas the large aggregate faction is considerably varied. The advantage in hysteresis of the nano-structure black family therefore seems to be exclusively attributable to the rough, disordered surface. Drawbacks in abrasion resistance are no longer to be expected with the narrow asd nano-structure grades; their strong carbon black polymer interaction should actually improve treadwear.

TABLE 3

Tan δ 60° C. reductions and aggregate size distributions of various N 234 type carbon blacks.

| Sample | | N 234 ASTM | Sample A | Sample B | EB 171 |
|---|---|---|---|---|---|
| CTAB | m²/g | 119 | 117 | 120 | 118 |
| CDBP | ml/100 g | 100 | 100 | 101 | 100 |
| Aggregate size distribution | | | | | |
| Mean aggregate size | nm | 72 | 107 | 88 | 76 |
| Width (standard deviation) | nm | 23 | 71 | 37 | 31 |
| Width at half height | nm | 49 | 63 | 60 | 50 |
| Fraction >150 nm | % | 0–1 | 22 | 7.3 | 3.6 |
| tan δ 60 ° C. decrease | % | — | −14.2 | −12.0 | −13.5 |

To verify this expectation, a comparison between a conventional ASTM black, a low hysteresis experimental black with broad aggregate size distribution, and a nano-structure black, was carried out in a passenger tire tread formulation based on S-SBR/BR Treadwear testing was carried out using a new laboratory test equipment which allows treadwear monitoring under various driving severities 1718 (LAT 100, system Dr. Grosch).

Figure 12:
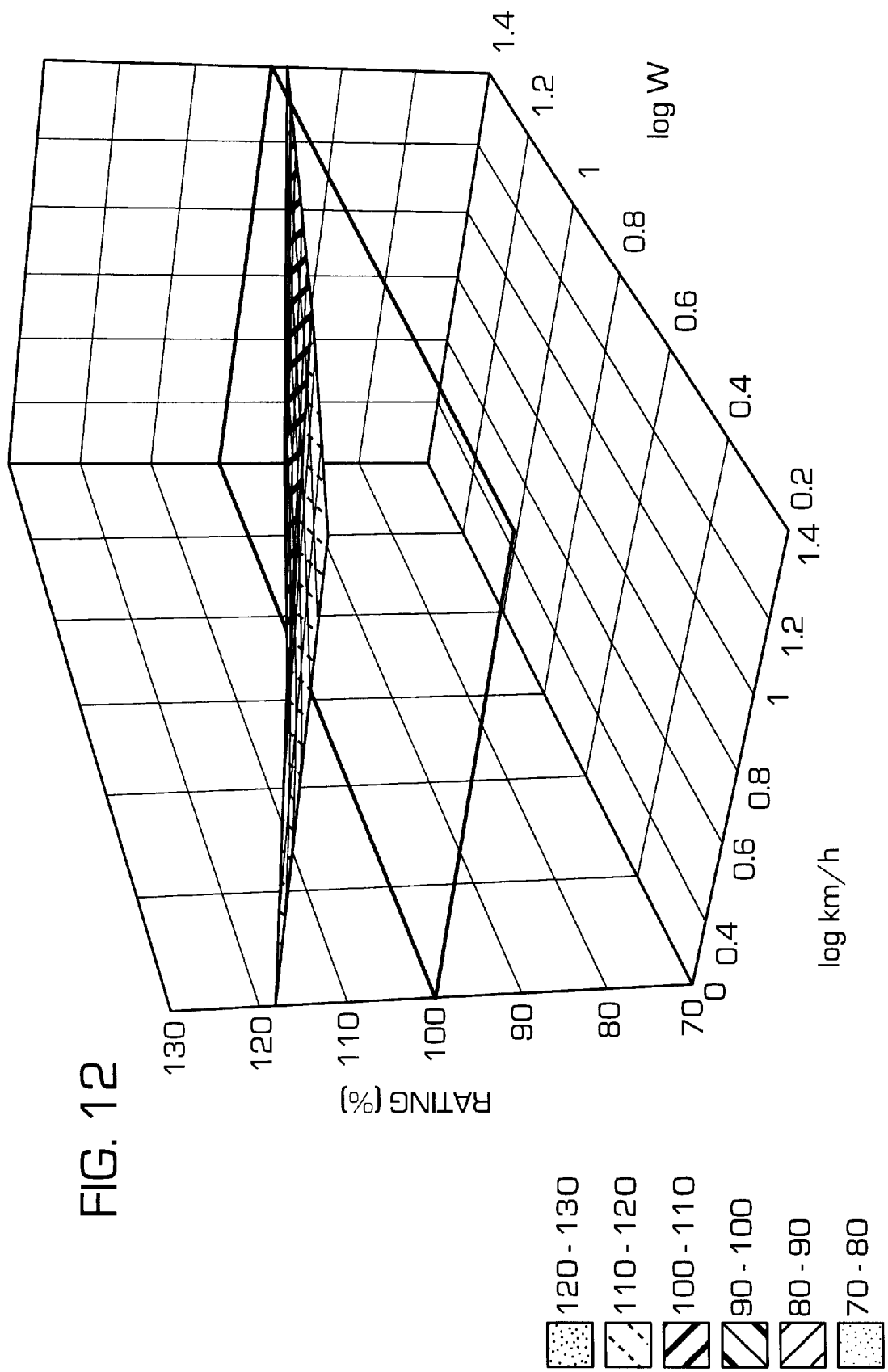
FIGS. 12, 13 and 14 demonstrate the results of treadwear testing under various driving severities, plotting the abrasion rating and corresponding values of the log of km/h values and the log of the W (energy) values.
Figure 13:
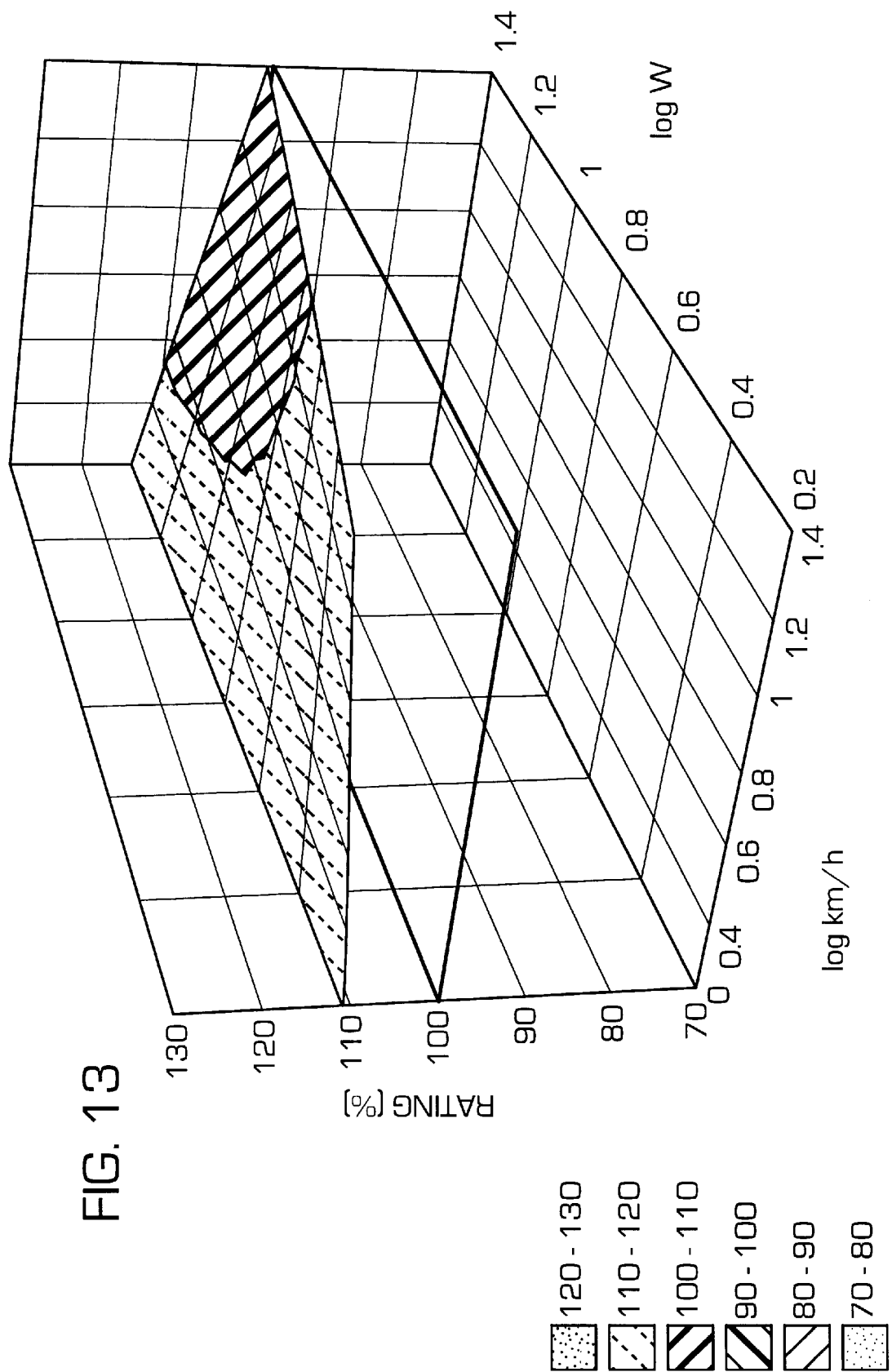
Figure 14:
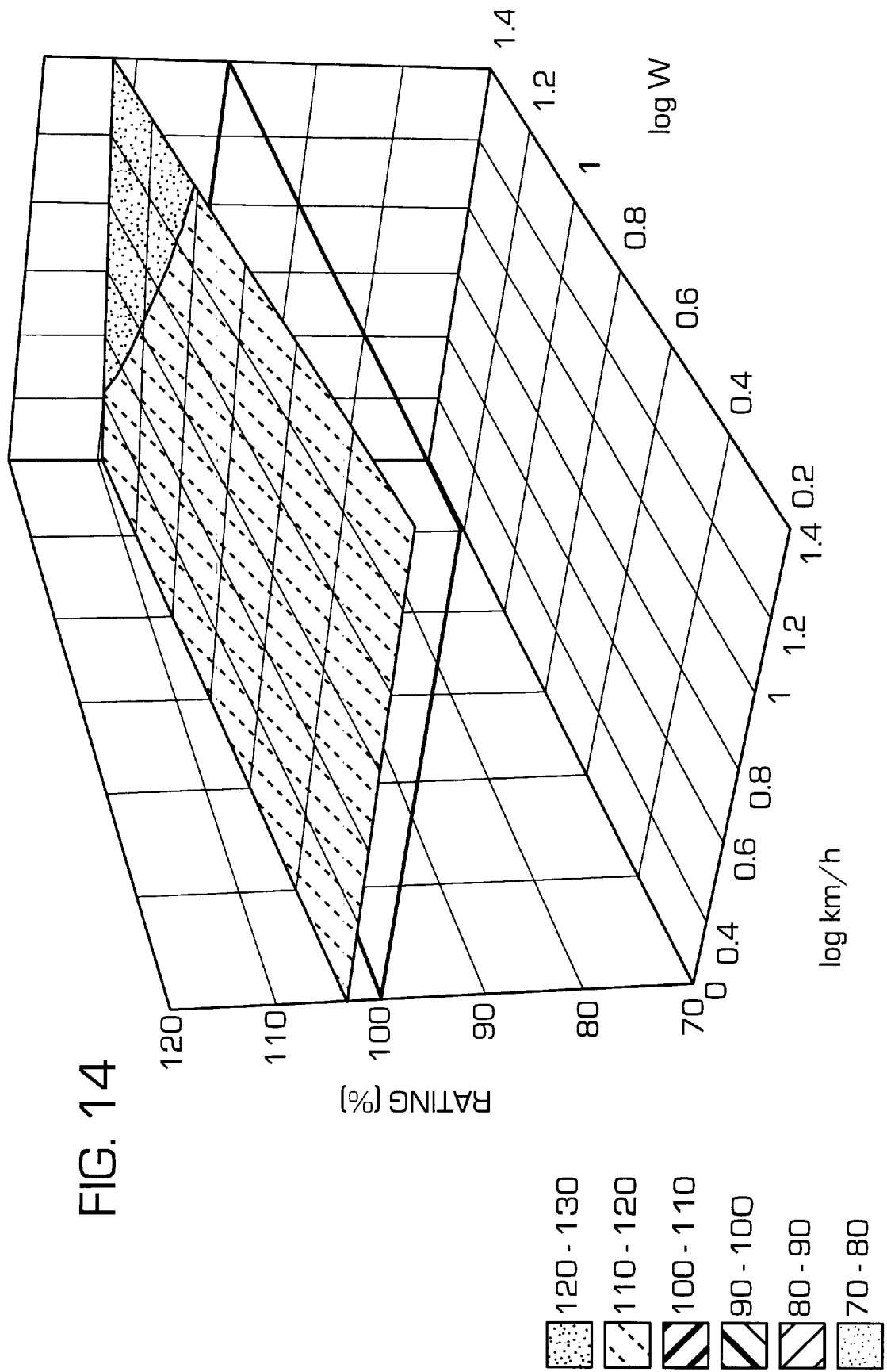

FIGS. 12 and 13 clearly demonstrate the positive effect on treadwear given by a narrow asd. Whereas the broad asd EB 145 shows an obviously high severity treadwear weakness, the narrow asd nano-structure EB 167 gives excellent abrasion resistance at all severities. Overall treadwear performance of EB 167 is superior to the respective ASTM black N 356. This is also shown in FIG. 14, which gives the treadwear performance of EB 171 and the broad asd black A (Table 3).

Besides rolling resistance and treadwear, wet skid resistance is a third important tire property which was also tested using the Grosch testing machine. Those results are given in Table 4.

TABLE 4

Wet traction index ratings of nano-structure and conventional blacks.

| Sample | N 115 | Ref. to EB 169 | EB 169 | N 234 | EB 171 | N 356 | EB 167 |
|---|---|---|---|---|---|---|---|
| Wet handling | 100 | 104 | 105 | 100 | 100 | 100 | 101 |
| Anti-lock braking | 100 | 104 | 106 | 100 | 100 | 100 | 101 |
| Lock braking | 100 | 104 | 105 | 100 | 100 | 100 | 101 |

Wet skid results overall show small advantages of the nano-structure blacks compared to conventional blacks.

Nan-structure blacks are thus a new family of carbon blacks characterized by a rough surface and enhanced filler-polymer interaction. Consequently, the slippage of polymer molecules along the rough nano-structure surface, which is the major hysteris mechanism in rubber compounds, is hindered and hysteresis significantly reduced. It can be demonstrated that aggregate size distribution does not dry correlate with hysteresis. Hence, narrow asd blacks with strong polymer interaction have been produced. Such blacks, in addition to low hysteresis, also give improved treadwear and are ideally suited to meet truck tire tread requirements.

DETAILED DESCRIPTION OF THE INVENTION

The above and other objects of the present invention are achieved by a furnace carbon black with CTAB values of 20–190 m$^2$/g and 24M4-DBP absorptions of 40–140 mL/100 g, with a ratio tan $\delta_0$/ tan $\delta 60$ which, during incorporation in an SSBR/BR rubber compound, satisfies the relation $$\tan \delta_0 / \tan \delta_{60} > 2.76 - 6.7 \times 10^{-3} \times CTAB,$$

where the value of tan $\delta_{60}$ is always lower than the value for ASTM carbon blacks with the same CTAB surface area and 24M4-DBP absorption. This carbon black is characterized in that the distribution curve of the particle diameter sizes of the carbon black aggregate has an absolute skewness of less than 400,000 nm$^3$.

A further feature of the invention resides in the method of producing the above furnace carbon blacks, as described herein below.

DETAILED DESCRIPTION OF INVENTION

The carbon blacks according to the invention satisfy, as far as the ratio tan $\delta_0$/ tan $\delta_{60}$ goes, the same requirements as the mentioned inversion carbon blacks, and, therefore, when incorporated into rubber compounds, they impart a reduced rolling resistance to the resulting tires. However, compared to the known inversion carbon blacks, they are characterized by a narrower particle size distribution. For the description of the particle size distribution, the measure of "absolute slewness" used in statistics is used here (see: Lothar Sachs: Statistical Evaluation Methods," (in German) Springer-Verlag, Berlin, 3rd edition, pages 81–83). It represents a description which is appropriate for the present problem, describing the shape of the particle size distribution curve as a range of particle sizes limited by maximum and minimum values.

The "absolute skewness" is defined as the deviation from a symmetrical particle size distribution. A slanted distribution curve exists when one of the two descending branches of the distribution curve is elongated. If the left curve portion is elongated, this is referred to as a negative skewness, that is, the determination of the absolute skewness determines values of less than zero. If the right curve section is elongated, the slope is positive, with values larger than zero. The known ASTM carbon blacks, as well as the inversion carbon blacks, and the carbon blacks according to the invention, present varying degrees of positive skewness.

It was unexpectedly discovered that the accepted conception, in the state of the art, that a wider particle size distribution of the reinforcement carbon black imparts a reduced rolling resistance to the rubber compounds is not generally valid. The improvement of the rolling resistance of rubber compounds with inversion carbon blacks is apparently not only dependent on the widths of the particle size distribution, but, instead, it is essentially determined by the larger surface roughness of the inversion carbon blacks and the associated better binding of the rubber polymer to the carbon black surface.

Compared to known inversion carbon blacks with a relatively wide particle size distribution, it has now become possible to improve their abrasion resistance according to the invention by limiting the widths of the particle size distribution. In particular, the proportion of carbon black particles with large particle diameters must be reduced, if the carbon blacks are to impart to the rubber compounds an improved abrasion resistance, simultaneously with a reduced rolling resistance. This is the case when the absolute skewness of the particle size distribution is smaller than 400,000, preferably smaller than 200,000, nm$^3$. The absolute slope of the inversion carbon blacks known from DE 195 21 565 is higher than 400,000 nm$^3$, whereas the absolute slope of standard ASTM carbon blacks is less than 100,000 nm$^3$.

The absolute skewness of the particle size distribution of carbon black can be determined by means of a disk centrifuge and a corresponding evaluation of the measured values. The carbon black sample to be examined is in this process dispersed in an aqueous solution and separated in a disk centrifuge according to particle size; the larger the particles are, the greater is their weight, and thus the carbon black particles move more rapidly as a result of centrifugal force in the aqueous solution towards the outside. In this process, they pass through a light barrier, by means of which the extinction is recorded as a function of time. From these data, the particle size distribution, that is the frequency as a function of particle diameter, is calculated. Then the absolute skewness AS can be determined as follows:

$$AS = \frac{\sum_{i=1}^{k} H_i (x_i - \bar{x})^3}{\sum_{i=1}^{k} H_i}$$

In the formula, $H_i$ denotes the frequency at which the particle diameter $x_i$ occurs and is the particle diameter of the particles whose weight corresponds to the average particle weight of the carbon black aggregate. Also, is calculated using the particle size distribution. The summations of the above formula must be carried out in the range from 1 nm to 3000 nm in equidistant spacing for each nanometer. Any missing measurement values are estimated by linear interpolation.

The inversion carbon blacks according to the invention can be manufactured according to the generic method described in DE 195 21 565, corresponding to U.S. application Ser. No. 08/665,632 which are both relied on and incorporated herein by reference. According to this method, the inversion carbon black is manufactured in a carbon black reactor, which contains, along the reactor axis, a combustion zone, a reaction zone and a termination zone. In the combustion zone, a stream of hot combustion gases is generated by the combustion of a primary carbon black raw material in oxygen-containing gases. This hot gas stream is led from the combustion zone through the reaction zone into the termination zone. In the reaction zone, a secondary carbon black raw material is admixed with the hot waste gas. The carbon black formation is terminated in the termination zone by spraying with water. In this process, oil, an oil/natural gas mixture, or natural gas alone is used as the carbon black raw material. The combustion of the primary carbon black raw material in the combustion zone is managed in such a manner that carbon black nuclei form, with which the secondary carbon black raw material is immediately brought into contact.

To obtain the carbon blacks according to the invention, this method must be implemented in such a manner that the carbon black which is forming has a particle size distribution with an absolute skewness of less than 400,000 nm³. This can be achieved, for example, by increasing the addition of combustion air, primary and secondary carbon black raw material.

The described method is not limited to a certain reactor geometry. Rather, it can be adapted to different reactor types and reactor sizes. The desired nucleus formation in the combustion zone can be regulated by a person skilled in the art using different measures. Possible parameters for opting the nucleation in the case of the use of oil as a fuel are the combustion air/oil ratio by weight, the type of atomizer used for the fuel, and the size of the atomized oil droplet. As combustion atomizers it is possible to use pure pressure atomizers (single-substance atomizers) or two-substance atomizers with internal or external mixing, where pressurized air, steam, hydrogen, an inert gas or a hydrocarbon gas can be used as the atomization medium. The above-described combination of a liquid fuel and a gaseous fuel can thus be implemented, for example, by using the gaseous fuel as the atomization medium for the liquid fuel.

It is preferred to use two-substance atomizers for the atomization of liquid fuel. Whereas, in single-step substance atomizers, a change in the flow rate leads to a change in the droplet size, in the case of two-substance atomizers, the particle size can be influenced largely independently of the flow rate.

The size of the atomized droplets must be regulated in such a manner that at the site of the injection of the carbon black oil a sufficient number of carbon black nuclei is still available. The optimal droplet size depends on the geometry of the selected reactor. In the reactor used in the example, average droplet diameters of 50–100 μm have proven effective. These values were determined using the atomization of water. The optimal regulation of the atomizers, however, is best carried out empirically at the reactor by observation of the appearance of the flame. An excessively fine atomization of the liquid fuel leads to complete combustion of the droplet without nucleation. Excessively large droplets lead to choking and to an unstable flame. A slightly sooty flame leads to good nucleation.

The so-called carbon black oils, that is, the high aromatic and/or long-chain oils, can be used alone or in combination with hydrocarbon-containing gases, particularly natual gas, as the carbon black raw material. Suitable carbon black oils are petrochemical oils (steam cracker oils, cat cracker oils), carbochemical oils (hard coal oil) and pyrolysis oils with a BMC index of over 130. These oils are also atomized, as in the case of liquid fuels, preferably using two-substance atomizers.

By the method according to the invention, the entire range of industrial furnace carbon blacks can be manufactured. Persons skilled in the art are aware of the measures required for this method, such as, for example, the regulation of the residence time in the reaction zone and the addition of additives to influence the carbon black structure. It was discovered that the carbon blacks prepared by the method according to the invention differ significantly from conventional carbon blacks using the same characteristics of carbon black analysis. In the incorporation in SSBR/BR rubber compounds, these carbon blacks impart to the resulting rubber compound a $\tan \delta_0 / \tan \delta_{60}$ ratio which is larger than that obtained with conventional carbon blacks, while, simultaneously, having a $\tan \delta_{60}$ value which is less than a corresponding value for ASTM carbon blacks with the same CTAB surface area and 24M4-DBP absorption. This observation applies to carbon blacks with CTAB values between 20 and 190 m²/g, particularly to carbon blacks with CTAB values between 60 and 140 m²/g, and 24M4-DBP absorption values of 40 and 140 mL/100 g. In addition, with these carbon blacks, an appropriate control of the process method can be used to prevent the particle size distribution curve from containing particularly large proportions with large particle diameters.

The carbon blacks according to the invention impart to the SSBR/BR rubber compounds a stronger dependency of tan δ on temperature. In addition to this effect, called inversion in DE 195 21 565, the carbon blacks according to the invention present a narrowed particle size distibution compared to the conventional inversion carbon blacks. The dynamic elongation modulus |E*| of the SSBR/BR rubber compound with the carbon blacks according to the invention is as a rule lower, at 0° C., than the elongation modulus associated with the use of standard ASTM carbon blacks.

The nucleus-induced carbon black formation has, as in the case of the known inversion carbon blacks, an effect on the structuring of the surface of the carbon black particles. Examinations by atomic force microscopy (AFM) have shown that the carbon blacks according to the invention present a rougher surface than the standard ASTM carbon blacks.

EXAIMPLES

The invention will now be further explained with reference to the following examples.

Examples 1 and 2

Figure 15:
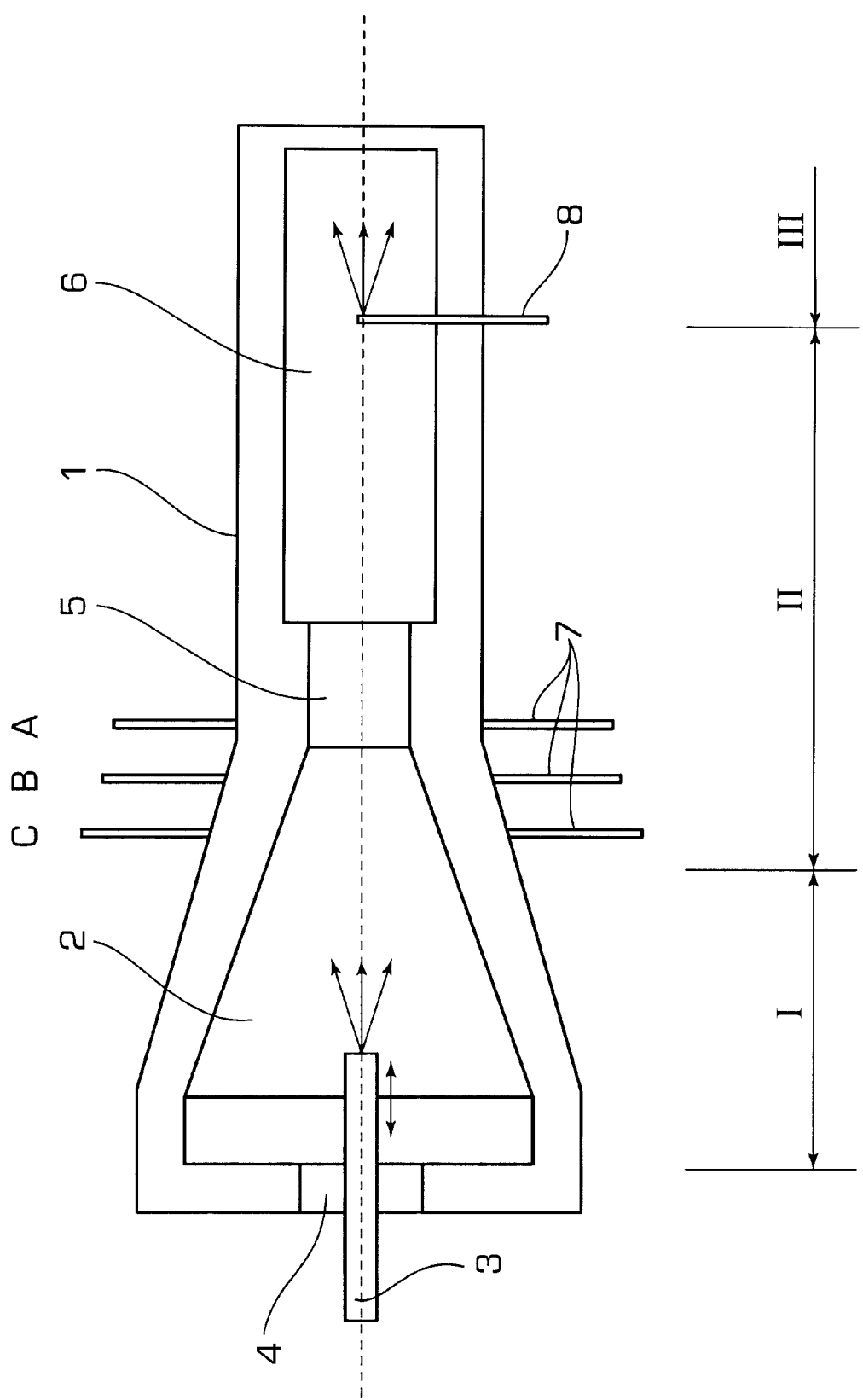
FIG. 15 is a schematic longitudinal section through the reactor used for the manufacture of the carbon blacks according to the invention.

In the carbon black reactor represented in FIG. 15, a conventional inversion carbon black (Example 1) and an inversion carbon black according to the invention (Example 2) were manufactured.

The carbon black reactor 1 has a combustion chamber 2, in which the hot waste gas is generated for the pyrolysis of the carbon black oil by the combustion of the primary carbon black raw material with the addition of oxygen from air. The primary carbon black raw material is introduced through the axial burner lance 3 into the combustion chamber 2. The burner lance 3 can be shifted in the axial direction to optimize the nucleus-induced carbon black formation.

The addition of the combustion air occurs through the opening 4 in the front wall of the combustion chamber 2.

The combustion chamber narrows conically toward the narrow section 5. After the reaction gas mixture has passed the narrow section, it expands in the reaction chamber 6.

A, B and C designate different positions for the injection of the carbon black oil into the hot process gas by means of the oil lances 7. The oil lances, at their tips, have appropriate spray nozzles. Four injectors are distributed over the circumference of the reactor at each injection point.

The combustion zone, reaction zone and termination zone, which are of importance for the method according to the invention, are identified in FIGS. 15 using Roman numerals I–III, respectively. They cannot be sharply distinguished from each other. Their axial extension depends from the given positioning of the burner lance, the oil lances and the quenching water lance 8.

The dimensions of the reactor used can be obtained from the following list:

| | |
|---|---|
| Largest diameter of the combustion chamber: | 900 mm |
| Length of the combustion chamber to the narrowed section: | 1390 mm |
| Length of the conical part of the combustion chamber: | 1160 mm |
| Diameter of the narrowed section: | 140 mm |
| Length of the narrowed section: | 230 mm |
| Diameter of the reaction chamber: | 250 mm |
| Position of the oil lances[1]: | |
| A: | 110 mm |
| B: | −150 mm |
| C: | 320 mm |
| Position of the quenching water: | |
| Lance(s)[1] | ~1000 + 5500 mm |

[1]Measured from the entry into the narrowed section (+: after entry; −: before entry)

The two carbon blacks manufactured in the described reactor were pelletized using the conventional procedures, prior to their characterization and incorporation into the rubber compounds.

For the manufacture of the carbon blacks, a carbon black oil was used, as primary and as secondary carbon black raw materials, which has a BMC index of 160, and the properties listed

TABLE 5

| Property | Content |
|---|---|
| Carbon content (wt %) | 93.4 |
| Hydrogen content (wt %) | 5.9 |
| Sulfur content (wt %) | 0.6 |
| Distillate quantity up to 275° C. (vol %) | 7.5 |
| Distillate quantity up to 300° C. (vol %) | 17.2 |
| Distillate quantity up to 400° C. (vol %) | 83.9 |
| Distilled components (vol %) | 97.9 |

The reactor parameters for the manufacture of the carbon blacks are listed in Table 6.

TABLE 6

Reactor parameter for the manufacture of the carbon blacks of Example 1 (comparison carbon black) and Example 2

| Reactor parameters | | Examples | |
|---|---|---|---|
| Parameter | Unit | 1 | 2 |
| Combustion Air | Nm³/h | 2500 | 3500 |
| Temperature of the combustion air | °C. | 500 | 500 |
| Fuel (carbon black oil) | l/h | 200 | 240 |
| Position of the burner lance | mm | −1300 | −1300 |
| Carbon black oil | l/h | 590 | 860 |
| Carbon black oil temperature | °C. | 110 | 120 |
| Natural gas | Nm³/h | — | — |
| Position of the carbon black oil injectors | | 4XA | 4XA |
| Additive (K₂CO₃-solution) | l/h × g/l | 15 × 1 | 9.5 × 3 |
| Quench position | mm | 1095 | |
| Temperature at the reactor outlet | °C. | 750 | |

Determination of the characteristics of carbon black analysis:

In the carbon blacks according to the invention, and in several commercial comparison carbon blacks, the standard characteristics for carbon black analysis were determined according to the following standards:

CTAB surface area: ASTM D-3765

Iodine adsorption: ASTM D-1510

DBP absorption: ASTM D-2414

24M4-DBP absorption: ASTM D-3493

BET-surface area DIN 66132

Determination of the Viscoelastic Properties

The determination of the viscoelastic properties of the rubber compounds reinforced with these carbon blacks was carried out according to DIN 53513. In particular, the loss factors tan δ at 0° C. and at 60° C., as well as the dynamic elongation modulus |E*| at 0° C., were determined. The test fornulation used for the rubber compounds is listed in Table 7.

TABLE 7

| SSBR/BR test formulation | |
|---|---|
| Rubber components | Content (phr) |
| SSBR | 96.0 |
| BR | 30.0 |
| Carbon Black | 80.0 |
| ZnO RS | 3.0 |
| Stearic Acid | 2.0 |

TABLE 7-continued

SSBR/BR test formulation

| Rubber components | Content (phr) |
|---|---|
| Aromatic Oil | 10.0 |
| 6 PPD | 1.5 |
| Wax | 1.0 |
| CBS | 1.5 |
| Sulfur | 1.5 |

The SSBR rubber component is an SBR copolymer which is polymerized in solution and which has a styrene content of 25 wt % and a butadiene content of 75 wt %. The vinyl content of the butadiene is 67%. The copolymer contains 37.5 phr oil, and it is marketed under the commercial name of Buna VSL 5025-1 by Bayer AG. Its Mooney viscosity (ML 1+4/100° C.) was approximately 50.

The BR rubber component is a cis-1,4-polybutadiene (Neodym type) with a cis-1,4 content of 97 wt %, a trans-1,4 content of 2 wt %, a 1,2-content of 1 wt %, and a Mooney viscosity of 38–48. These components are marketed under the commercial name of Buna CB 24 Bayer AG.

As the aromatic oil, Naftolen ZD from Chemetall was used. The PPD portion of the test formulation was Vulkanox 4020 and the CBS portion was Vulkacit CZ, both from Bayer AG. As the wax, the product known as Protector G35 from HB-Fuller GmbH was used.

The incorporation of the carbon blacks in the rubber compound was carried out in three steps, according to the following list in table form:

Step 1

| Settings | |
|---|---|
| Mixing Apparatus | Werner & Pfleiderer GK 1.5 N |
| Friction | 1:1.11 |
| Rpm | 70 min$^{-1}$ |
| Ram pressure | 5.5 bar |
| Empty volume | 1.6 L |
| Filler Content | 0.73 |
| Flow Temperature | 80° C. |
| Mixing Process | |
| 0–1 min | Buna VSL 5025-1 + Buna CB 24 |
| 1–2 min | ½ carbon black + ZnO RS + stearic acid + |
| 2–3 min | ½ carbon black + Vulkanox 4020 + Protector G35 + Naftolen ZD |
| 3 min | Cleaning |
| 3–4.5 min | Mixing |
| 4.5 min | Cleaning |
| 4.5–6 min. | Mixing and Completion |
| Batch temperature | 140–160° C. |
| Storage | 24 h at room temperature |

Step 2

| Settings | |
|---|---|
| Mixing Apparatus | As in step 1, except 0.68 |
| Filling Content | 0.71 |
| Speed | 90 min$^{-1}$ |
| Flow through temp. | 90° C. |
| Mixing process | |
| 0–2 min | Open batch from step 1 |
| 2 min–5 min | Batch temperature held at 165° C. by varying speed |
| 5 min | Completion |
| Batch temperature | 165° C. |
| Storage | 4 hr. at room temp. |

Step 3

| Settings | |
|---|---|
| Mixing Apparatus | As in step 1, except 0.65 |
| Filling Content | 0.69 |
| Speed | 40 min$^{-1}$ |
| Flow through temp. | 50° C. |
| Mixing Process | |
| 0–2 min | Batch from step 2 + Vulkacit CZ + sulfur |
| 2 min | Complete mixing and form a film on the laboratory mixing roller setup (Diameter 200 mm, length 450 mm, flow temperature 50° C). Then, for homogenization: Cut 3 times on the left and 3 times on the right, and fold over, and drop 8 times through narrow roller gap (1 mm) and 3 times with wide roll gap (3.5 mm), and then draw out the film. |

The subsequent determination of the viscoelastic properties was carried out, in each case, with five test bodies made of the above rubber compounds, under the following conditions:

TABLE 8

Determination of the viscoelastic properties according to DIN 53513
Vulcanization of the test bodies

| | |
|---|---|
| Vulcanization temperature | 165° C. |
| Vulcanization duration | $T_{95}$ + 3 min ($T_{95}$: DIN 53529 |
| Test body shape | |
| Shape | Cylindrical |
| Length | 10 mm |
| Diameter | 10 mm |
| Number | 5 |
| Test Machine | |
| Type/manufacturer | 830/MTS |
| Type of Load | Compression |
| Average force amplitude | 50 N |
| Dynamic force amplitude | ±25 N |
| Test frequency | 16 Hz |
| Test regimen | Temper for 5 min, then dynamic load application at 16 Hz for the duration of 2 min with subsequent measurement |

In each case, the average of the measurements performed on the five test bodies is used. The results of the viscoelastic examination are listed in Table 9 and graphically represented in FIG. 16. Fourteen commercial comparison carbon blacks, designated C1–C14 in Table 9, and the carbon blacks of Examples 1 and 2, were examined and are listed in Table 9. Table 9 contains also, to the extent known, the ASTM classification of the comparison carbon blacks.

Figure 16:
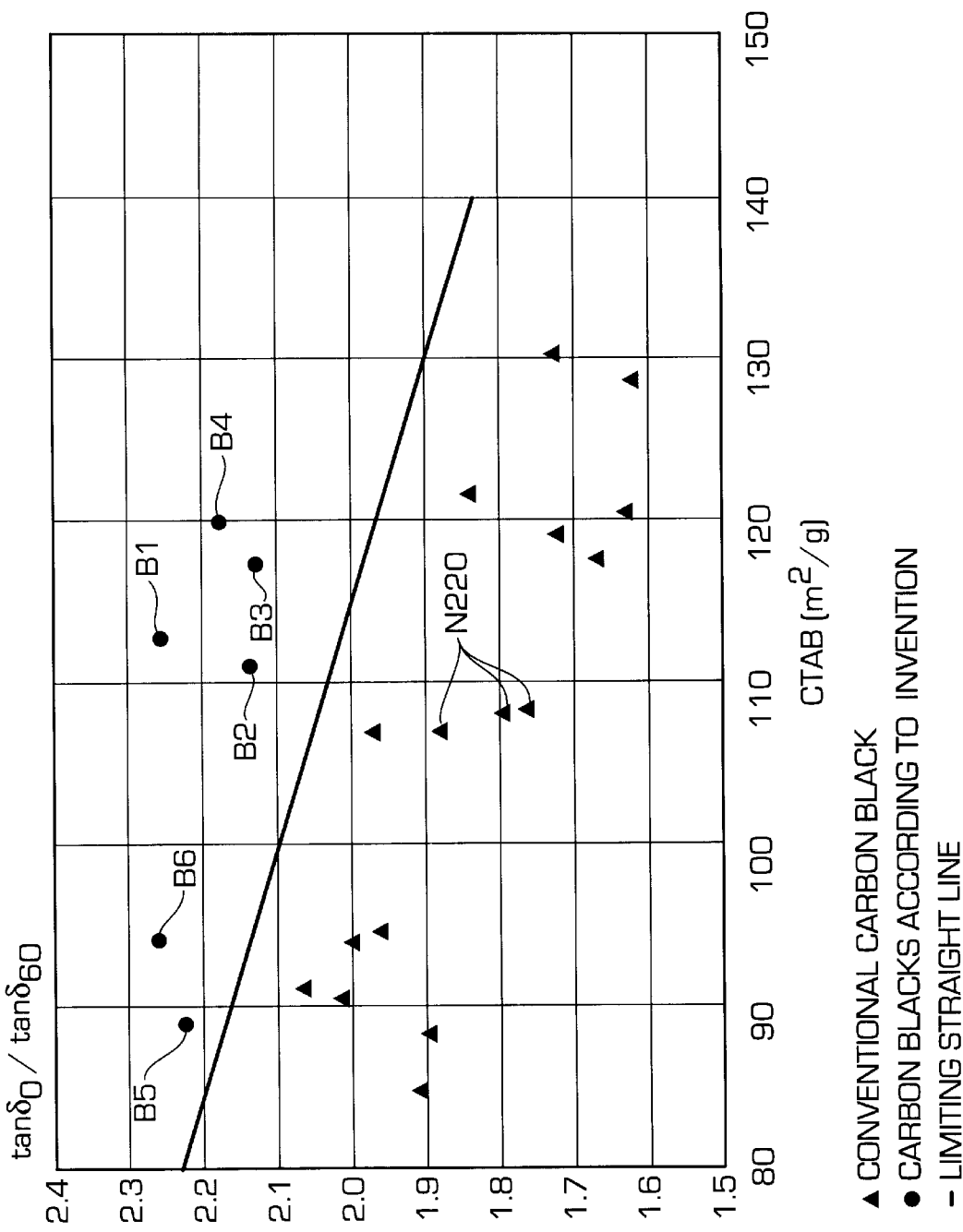
FIG. 16 is a diagram ofthe ratio of tan $\delta_0$/ tan $\delta_{60}$ above the CTAB surface area for different carbon blacks according to the invention and for conventional comparison carbon blacks.

In Table 9, the carbon blacks are ordered by increasing CTAB surface area. In FIG. 16, the ratio tan $\delta_0$/ tan $\delta_{60}$ is provided above the CTAB surface area for these carbon blacks. The two inversion carbon blacks, with identical CTAB surface area, have a clearly larger tan $\delta$ ratio, that is, a steeper temperature profile of the loss factor. This also applies particularly in comparison to the two low-hysteresis carbon blacks (C3 and C6) in Table 9, which are carbon blacks according to EP 0,315,442. With the lh carbon blacks, a steeper temperature profile of the loss factor could not be observed.

The ASTM designation does not apply to test carbon black V17, although it was prepared in the conventional manner. If one replaces the factor tan $\delta$ 0° C. tan $\delta$ 60° C., with the CTAB-number in FIG. 16, one recognizes that the commercial carbon blacks lie below and the carbon blacks designated with "B" lie above the designated line.

The range of the inversion carbon blacks can be clearly delimited from the conventional carbon blacks. It is above the limiting straight lines represented in FIG. 16, which are obtained from the relation $$\tan \delta_0 / \tan \delta_{60} = 2.76 - 6.7 \times 10^{-3} \times \text{CTAB}.$$

Furthermore, for the inversion carbon blacks it is characteristic that, with identical CTAB surface area and similar 24M4-DBP absorption compared to the standard ASTM carbon blacks, the loss factor tan $\delta_{60}$ obtained is lower, and in general the dynamic elongation modulus of the rubber compounds obtained is lower.

It will be seen fom Table 9 that tan $\delta_{60}$ is less than 0.40. It is preferred that tan $\delta_{60}$ is 0.3 or less, more preferably 0.25 or less.

TABLE 9

| Comparison | | CTAB | Iodine | DBP | 24M4-DBP | tan | tan | tan$\delta_0$/ | \|E*\| |
|---|---|---|---|---|---|---|---|---|---|
| No. | ASTM | [m²/g] | [mg/g] | [ml/100 g] | [ml/100 g] | $\delta_0$ | $\delta_{60}$ | tan $\delta_{60}$ | [MPa] |
| C1 | N347 | 84.7 | 89.3 | 121.2 | 98.2 | 0.526 | 0.276 | 1.906 | 35.5 |
| C2 | N347 | 88.3 | 89.2 | 121.2 | 99.8 | 0.511 | 0.270 | 1.893 | 36.4 |
| C3 | 1h-Ruβ | 91.1 | 79.9 | 133.1 | 101.1 | 0.516 | 0.250 | 2.064 | 35.0 |
| C4 | N375 | 94.0 | 89.1 | 111.2 | 98.8 | 0.526 | 0.263 | 2.000 | 35.3 |
| C5 | N375 | 94.6 | 90.8 | 115.2 | 97.0 | 0.533 | 0.272 | 1.960 | 35.2 |
| C6 | 1h-Ruβ | 106.8 | 92.9 | 136.7 | 106.9 | 0.504 | 0.256 | 1.969 | 34.5 |
| C7 | N220 | 106.9 | 118.9 | 114.2 | 97.1 | 0.533 | 0.284 | 1.877 | 40.4 |
| C8 | N220 | 107.9 | 120.9 | 114.3 | 98.7 | 0.522 | 0.291 | 1.794 | 42.7 |
| C9 | N220 | 108.2 | 119.6 | 114.1 | 98.1 | 0.522 | 0.296 | 1.764 | 45.4 |
| C10 | N234 | 117.5 | 120.3 | 123.3 | 100.9 | 0.492 | 0.295 | 1.668 | 50.9 |
| C11 | N234 | 119.0 | 123.1 | 122.2 | 101.4 | 0.509 | 0.296 | 1.720 | 48.3 |
| C12 | N234 | 120.4 | 119.0 | 123.6 | 109.8 | 0.489 | 0.300 | 1.630 | 50.7 |
| C13 | N115 | 128.4 | 157.6 | 113.5 | 97.5 | 0.511 | 0.315 | 1.622 | 50.7 |
| C14 | N115 | 130.1 | 158.2 | 108.4 | 97.2 | 0.518 | 0.300 | 1.727 | 47.4 |
| B1 | | 112.7 | 121.8 | 113.3 | 98.1 | 0.530 | 0.235 | 2.255 | 41.1 |
| carbon black examples | | | | | | | | | |
| | | 111.0 | 112.5 | 117.4 | 100.3 | 0.514 | 0.241 | 2.133 | 44.6 |

1 h: low hysteresis

TABLE 9a

| Comparison | | CTAB | Iodine | DBP | 24M4-DBP | | | tan $\delta_0$/ | \|E*\| |
|---|---|---|---|---|---|---|---|---|---|
| No. | ASTM | [m²/g] | [mg/g] | [ml/100 g] | [ml/100 g] | tan $\delta_0$ | tan $\delta_{60}$ | tan $\delta_{60}$ | [Mpa] |
| V15 | N234 | 121.5 | 120.1 | 125.4 | 96.5 | 0.458 | 0.249 | 1.839 | 47.5 |
| B3 | | 117.3 | 134.0 | 125.4 | 100.5 | 0.478 | 0.225 | 2.124 | 37.9 |
| B4 (EB 171) | | 119.8 | 127.4 | 125.1 | 100.6 | 0.487 | 0.224 | 2.174 | 36.9 |
| V16 | N356 | 90.5 | 99.6 | 152.1 | 111.6 | 0.449 | 0.223 | 2.013 | 40.0 |
| B5 | | 88.9 | 103.4 | 147.1 | 106.7 | 0.458 | 0.206 | 2.223 | 31.8 |
| B6 (EB 167) | | 94.1 | 105.2 | 140.3 | 106.5 | 0.472 | 0.209 | 2.258 | 31.3 |
| V17 (Ref. to EB 169) | | 134.9 | 143.8 | 94.0 | 83.7 | 0.437 | 0.283 | 1.544 | 58.9 |
| B7 (EB 169) | | 140.5 | 148.2 | 89.8 | 81.7 | 0.484 | 0.247 | 1.960 | 46.6 |

Particle size distribution curves:

For the measurement of the particle size distribution curves, a disk centrifuge BI-DCP with a red light diode from the company Brookhaven was used. This apparatus was developed specifically for the determination of particle size distribution curves for fine particulate solids from extinction measurements, and it was equipped with an automatic measurement and evaluation program for the determination of the particle size distribution.

To carry out the measurements, a dispersion solution was first prepared, consisting of 200 mL of ethanol, 5 drops of ammonia solution and 0.5 g Triton X-100, with demineralized water to bring up the volume to 1000 mL. Furthermore, a spinning solution was prepared, consisting of 0.5 g of Triton X-100, 5 drops of ammonia solution, and the volume is brought up to 1000 mL with demineralized water.

Subsequently, 20 mg of carbon black were mixed with 20 mL of dispersion solution, and suspended in a cooling bath in the solution for 4.5 min with 100-W ultrasound output (80% pulses). Before beginning the measurements, the centrifuge was operated for 30 min at an rpm of 11,000 min$^{-1}$. 1 mL of ethanol was injected into the rotating disk, and then a bottom layer was carefully applied with 15 mL of spinning liquid. After approximately 1 min, 250 μL of the carbon black suspension were injected, and the measurement program of the apparatus was started; then 50μL of dodecane were coated above the spinning liquid in the centifuge. Two measurements were determined for each sample measured.

The evaluation of the raw data curve was carried out with the calculation program of the apparatus taking into account a correction for scattered light, and with automatic base line fitting.

Figure 17:
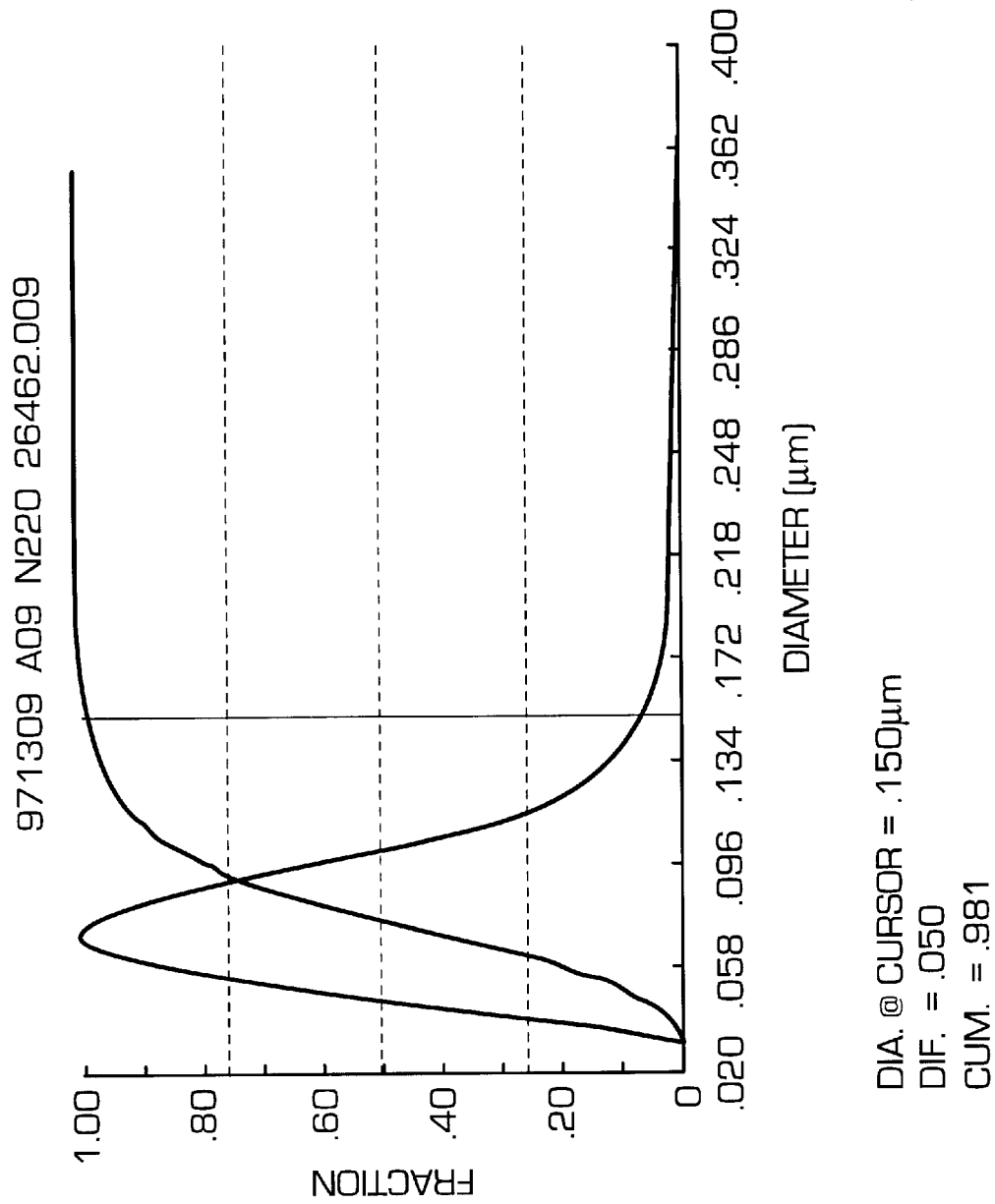
FIG. 17 is a particle size distribution curve of a standard ASTM carbon black N220.
Figure 18:
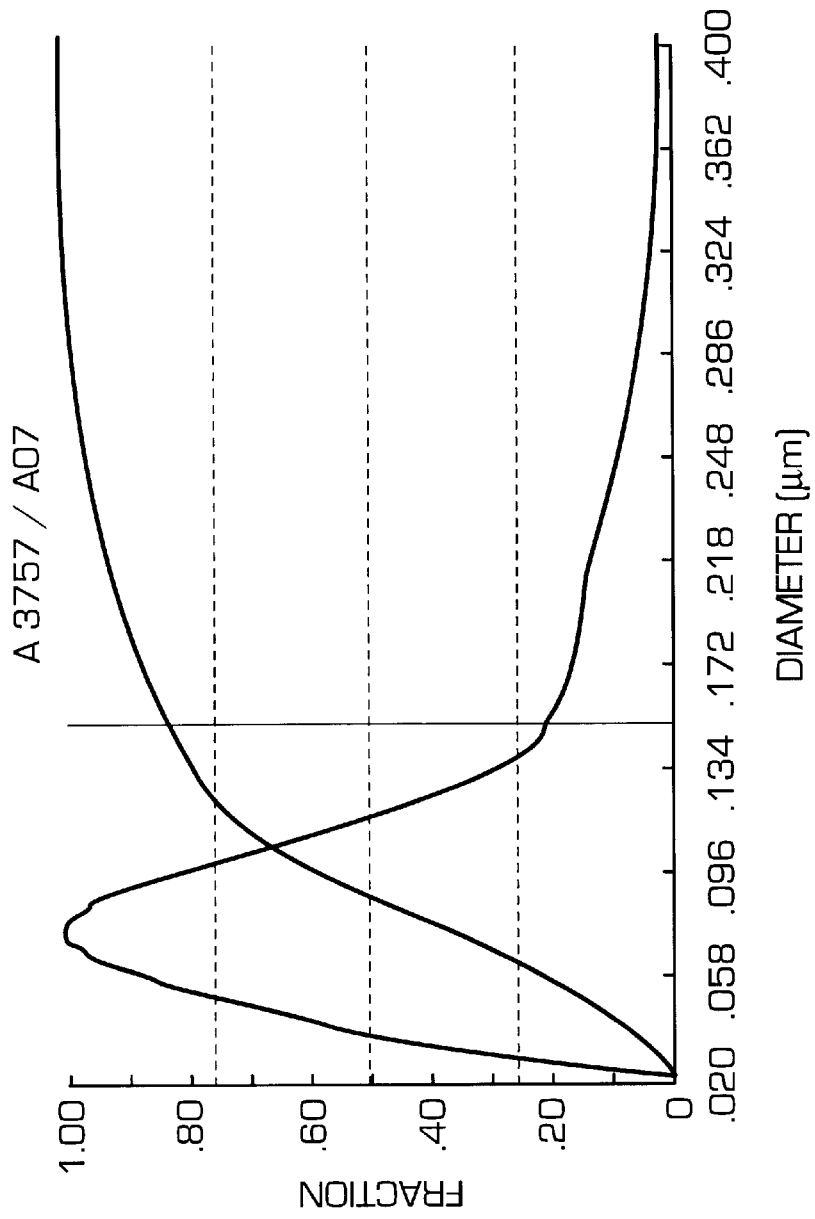
FIG. 18 is a particle size distribution curve of the conventional inversion carbon black of Example 1.
Figure 19:
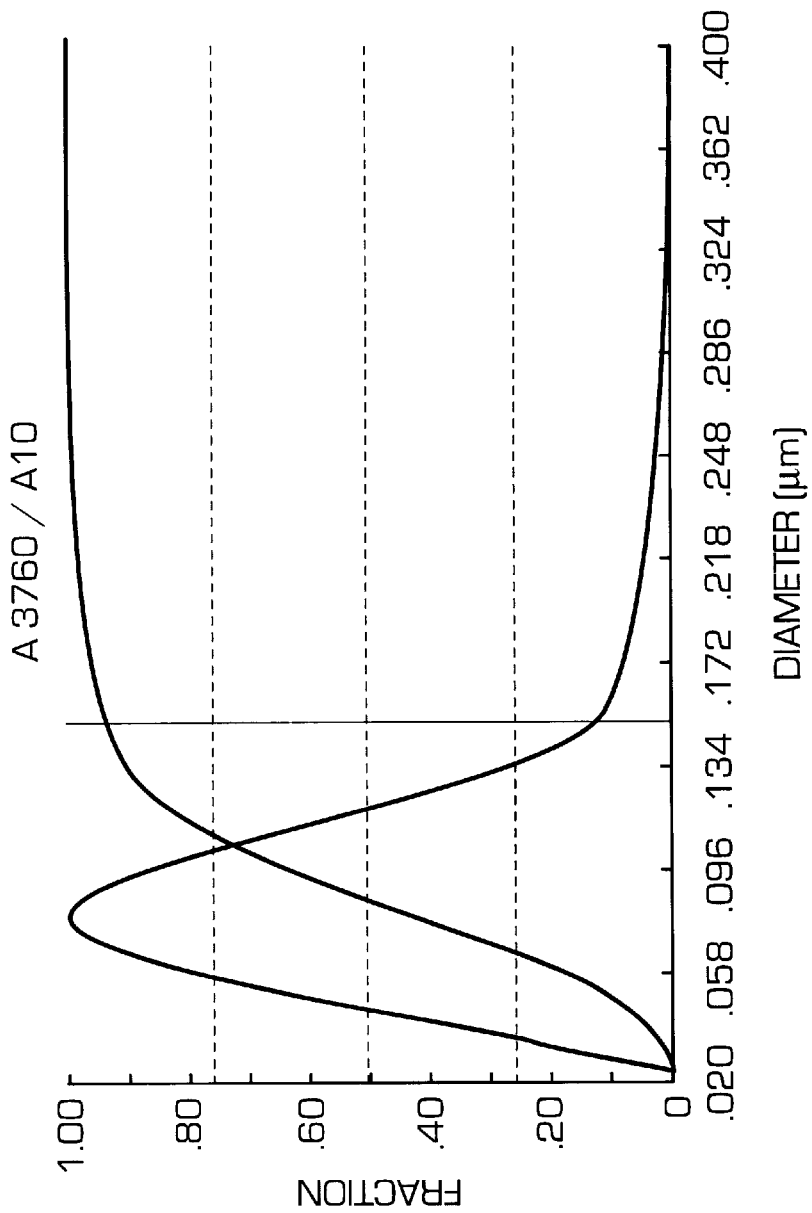
FIG. 19 is a particle size distribution curve of the invasion carbon black according to the invention of Example 2.

FIGS. 17–19 show the particle size distribution curves obtained, from which it is possible to calculate, as described above, the absolute slope of the distribution curves.

FIG. 17 is the distribution curve of the comparison carbon black C9 in Table 9, FIG. 18 is the distribution curve of the inversion carbon black of Example 2, and FIG. 19 represents the distribution curve of the inversion carbon black of Example 2 according to the invention. The known inversion carbon black of Example 1 shows a strong asymmetry in the distribution curve, which is specifically caused by a very large proportion of particle sizes above approximately 100 nm. This proportion of carbon black particles strongly decreases with the inversion carbon black according to the invention, which is apparent here in a correspondingly lower absolute skewness.

The values determined from such distribution curves for the absolute slope are listed for several standard ASTM carbon blacks and for the two inversion carbon blacks in Table 10. One can see that the standard ASTM carbon blacks present a very low absolute skewness, that is, their particle size distribution curves are relatively symmetrical. The known inversion carbon black of Example 1, in contrast, presents a very large absolute skewness of more than 400,000 nm$^3$. With the inversion carbon black of Example 2 according to the invention, the absolute slope is still larger than with the standard carbon blacks, but it is lower by approximately one-third of the absolute skewness obtained with the known inversion carbon black.

TABLE 10

Absolute skewness of the particle size distribution curves of several carbon blacks

| Carbon Black | Surface Area [m$^2$/g] | Absolute skewness [nm$^3$] |
| --- | --- | --- |
| N110 | 126.0 | 60448 |
| N115 | 127.7 | 27982 |
| N121 | 119.1 | 18344 |
| N134 | 131.2 | 51882 |
| N220 (C9, Table V) | 108.9 | 25285 |
| N234 | 119.3 | 38568 |
| N326 | 83.0 | 11658 |
| N339 | 89.2 | 22475 |
| N358 | 88.0 | 24854 |
| Example 1 | 112.7 | 439649 |
| Example 1 | 112.7 | 438794 |
| Example 2 | 111 | 133939 |
| Example 2 | 111 | 125985 |

TABLE 10a

Absolute skewness of the particle size distribution curves of several carbon blacks

| Carbon Black | Surface Area [m$^2$/g] | Absolute skewness [nm$^3$] |
| --- | --- | --- |
| B3 | 117.3 | 716199 |
| B4 (EB 171) | 119.8 | 275366 |
| B5 | 88.9 | 588090 |
| B6 (EB 167) | 94.1 | 348497 |
| V17 (ref. to EB 169) | 134.9 | 56682 |
| B7 (EB 169) | 140.5 | 330568 |

Table 10a lists additional carbon blacks in the same format as set out above in Table 10. The known inversion blacks (B3 and B5) have an absolute skewness of more than 400,000 nm$^3$ compared to the proprietary inversion blacks (B4 and B6). The new inversion blacks lie below this mark. The proprietary inversion blacks of example 7 likewise possess an absolute skewness that is less than 400,000 nm$^3$. The reference black V17, which is produced in a conventional manner, demonstrates an absolute skewness which is comparable to regular ASTM blacks.

As such, the additional examples in Table 10a show the same characteristics as those referenced in Table 10. Also, one can recognize that the qualities are typical of this type of carbon black, i.e., lower tan δ 60° C., narrow aggregate size distribution, as well as low absolute skewness, which are independent of the CTAB-number as well as the surface, and also independent of the structure (the DBP-number) of the carbon blacks concerned. Therefore, the enumerated advantages of the invention, such as reduced rolling resistance and improved wear, are universal qualities which can be given to any carbon black type by means of the claimed invention.

The carbon blacks set out in Tables 9a and 10a, B4 (EB 171), B6 (EB 167), and B7 (EB 169), plus reference black V17 (referring to EB 169) are also set out above in the Introduction to Technology section. The improvement with respect to tan δ 60° C. (correlated with rolling resistance) is seen in FIG. 8, and Table 3 shows that the aggregate size distribution of the new inversion blacks can be kept low without affecting the tan δ 60° C. values. A narrow aggregate size distribution corresponds with a lower absolute skewness, which is shown in the new inversion blacks as compared to the previous ones.

Abrasion Tests

The abrasion behavior of rubber compounds, which were prepared using the two inversion carbon blacks and the standard carbon blacks N220, were examined using a special abrasion test. This abrasion test allows the evaluation of the abrasion of a rubber compound relative to a reference rubber compound for different loads and speeds.

The abrasion test used is described in detail in the following publications:

K. A. Grosch, the 131th ACS Rubber Div. Meeting, No. 97 (1987) and

K. A. Grosch et al., Kautsch. Gummi Kunstst. 50, 841 (1997).

A corresponding test apparatus is commercially available. Therefore, reference is made to the above publications, regarding details of the abrasion test performed with this apparatus.

The rubber compounds used for the abrasion tests were identical to the rubber compounds for the viscoelastic examinations. As reference rubber compound, the rubber compound with the standard carbon black N220 (C9) was used.

Figure 20:
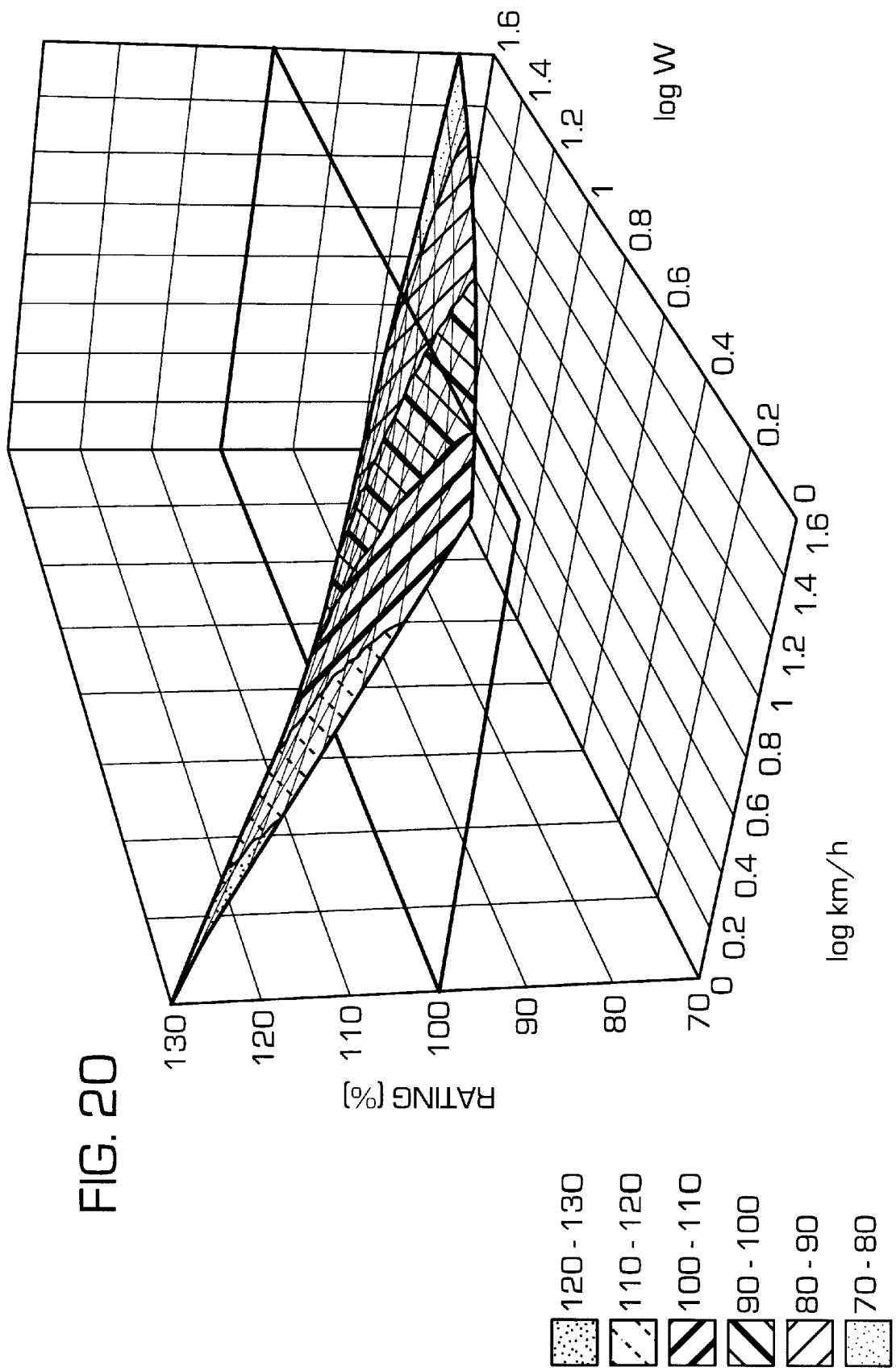
FIG. 20 is a representation of a 3-dimensional graph showing abrasion behavior of a rubber compound using carbon black according to Example 1, compared to a reference rubber compound.
Figure 21:
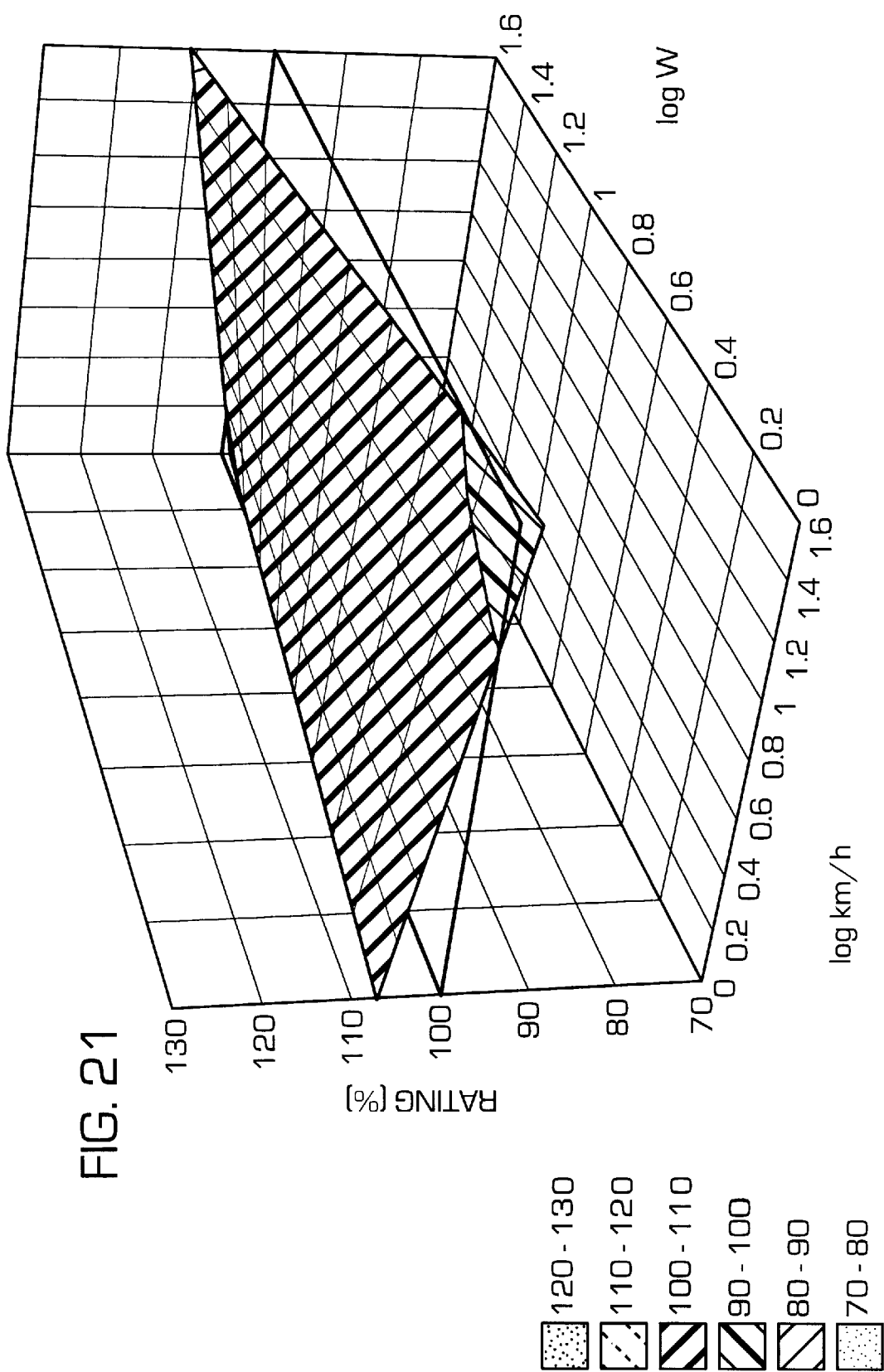
FIG. 21 is a representation of a 3-dimensional graph showing abrasion behavior of a rubber compound using carbon black according to Example 2, compared to a reference rubber compound.

FIGS. 20 and 21 show the obtained results in the three-dimensional diagrams of these figures, the evaluation of the abrasion is plotted versus the reference rubber compound, as a function of the logarithm of the speed and the logarithm of the energy W recorded as a result of the load application to the test body. The abrasion behavior of the reference rubber compound is set equal to 100.

FIG. 20 shows the abrasion behavior of a rubber compound using the inversion carbon black of Example 1. One can see that the rubber compound with the known inversion carbon blacks, in the case of small load application and low speeds has a considerably reduced abrasion compared to the reference rubber compound. However, if the applied loads are high, the abrasion increases compared to the reference rubber compound.

FIG. 21 shows the abrasion behavior of a rubber compound using the inversion carbon black of Example 2 according to the invention in comparison with the reference rubber compound. The rubber compound with the inversion carbon black according to the invention shows a more balanced abrasion behavior than the known inversion carbon black. It is precisely at high speeds and high loads that this rubber compound still presents a 10% improved abrasion behavior. The carbon blacks according to the invention are therefore excellently suited for the manufacture of rubber compounds for tire cap surfaces and adhesive mixtures.

FIGS. 12 and 13 clearly demonstrate the positive effect on treadwear given by a narrow aggregate size distribution. Whereas the broad aggregate size distribution EB 145 (known inversion black) shows an obviously high severity treadwear weakness, the narrow aggregate size distribution nano-structure EB 167 gives excellent abrasion resistance at all severities. Overall treadwear performance of EB 167 is superior to the respective ASTM black N 356. This is also shown in FIG. 14, which gives the treadwear performance of EB 171 and the broad aggregate size distribution black A (Table 3).

The range values of tan δ and |E*| were measured according to DIN 53513 which is incorporated herein by reference.

Further variations and modifications of the foregoing will be apparent to those skilled in the art and are intended to be encompassed by the claims appended hereto.

German priority applications 198 16 025.9 and 198 39 925.1 are relied on and incorporated herein by reference.

We claim:

1. Inversion carbon black having the following properties: a particle size distribution curve with an absolute slope of less than 400,000 nm$^3$, the absolute slope AS being determined from measured aggregate size distribution using the following formula:

$$AS = \frac{\sum_{i=1}^{k} H_i (x_i - \bar{x})^3}{\sum_{i=1}^{k} H_i}$$

wherein $H_i$ denotes the frequency at which the particle diameter $X_i$ occurs and $\bar{x}$ is the particle diameter of the aggregate, whose weight corresponds to the average particle weight of the carbon black aggregate, the summation being carried out in the range of 1 to 3000 nm in equidistant spacing for each nanometer; and when incorporated in an SSBR/BR rubber compound, the carbon black results in the rubber compound satisfying the relation tan $\delta_0$/ tan $\delta_{60}$>2.76–6.7×10$^{-3}$×CTAB, and results in the rubber compound having a tan $\delta_{60}$ value which is lower than that of a rubber compound incorporating an equivalent amount of a conventional ASTM carbon black having the same CTAB surface area and 24M4-DBP absorption value.

2. The inversion carbon black according to claim 1, wherein the particle size distribution curve of the carbon black has an absolute slope of less than 200,000 nm$^3$.

3. Inversion carbon black having the following properties:
a CTAB value from 20 to 190 m$^2$/g and a 24M4-DPB absorption value from 40 to 140 mL/100 g;

when incorporated in an SSBR/BR rubber compound, imparts to the resulting rubber compound a tan $\delta_0$/ tan $\delta_{60}$ ratio which is larger than that obtained with an SSBR/BR nibber compound incorporating an equivalent amount of a conventional ASTM carbon black having the same CTAB surface area and 24M4-DBP absorption, which resulting rubber compound satisfies a relationship between tan $\delta_0$/ tan $\delta_{60}$ ratio and CTAB surface area such that a plot of the relationship lies above the line depicted in FIG. 16; and when incorporated in an SSBR/BR rubber compound, imparts to the resulting rubber compound a tan $\delta_{60}$ value which is less than that of an SSBR/BR rubber compound incorporating an equivalent amount of a conventional ASTM carbon black having the same CTAB surface area and 24M4-DBP absorption.

4. The inversion carbon black according to claim 3, wherein the CTAB surface area of the inversion carbon black is from 60 to 140 m$^2$/g.

5. The inversion carbon black according to claim 3, wherein the tan $\delta_{60}$ value is less tban 0.40.

6. The inversion carbon black according to claim 3, wherein the tan $\delta_{60}$ value is less than 0.3.

7. The inversion carbon black according to claim 3, wherein the tan $\delta_{60}$ value is less than 0.25.

8. A method for manufacturing the inversion carbon black according to claim 1, comprising:

generating a combustion gas stream in a combustion zone by combusting a primary carbon black raw material in an oxygen-containing gas to form nuclei;

feeding the combustion gas stream containing nuclei from the combustion zone through a reaction zone;

admixing a secondary carbon black raw material with the combustion gas stream containing nuclei in the reaction zone;

feeding the combustion gas stream from the reaction zone into a termination zone; and terminating carbon black formation in the termination zone by spraying with water, wherein the primary carbon black raw material is at least one member selected from the group consisting of oil and natural gas, and wherein the combustion air, the primary carbon black raw material and the secondary carbon black raw material are provided in amounts such that the resulting absolute skewness of the particle size distribution curve of the forming carbon black is less than 400,000 nm$^3$.

9. A method for manufacturing the inversion carbon black according to claim 3, comprising:

generating a combustion gas stream in a combustion zone by combusting a primary carbon black raw material in an oxygen-containing gas to form nuclei;

feeding the combustion gas stream containing nuclei from the combustion zone through a reaction zone;

admixing a secondary carbon black raw material with the combustion gas stream containing nuclei in the reaction zone;

feeding the combustion gas stream from the reaction zone into a termination zone; and terminating carbon black formation in the termination zone by spraying with water, wherein the primary carbon black raw material is at least one member selected from the group consisting of oil and natural gas, and wherein the combustion air, the primary carbon black raw material and the secondary carbon black raw material are provided in amounts such that the resulting absolute skewness of the particle size distribution curve of the forming carbon black is less than 400,000 nm$^3$.

10. A vehicle tire comprising the inversion carbon black according to claim 1.

11. A vehicle tire comprising the inversion carbon black according to claim 3.

12. Inversion carbon black having the following properties:

a particle size distribution curve with an absolute slope of less than 400,000 nm$^3$, the absolute slope AS being determined from measured aggregate size distribution using the following formula:

$$AS = \frac{\sum_{i=1}^{k} H_i (x_i - \bar{x})^3}{\sum_{i=1}^{k} H_i}$$

wherein $H_i$ denotes the frequency at which the particle diameter $x_i$ occurs and $\bar{x}$ is the particle diameter of the aggregate, whose weight corresponds to the average particle weight of the carbon black aggregate, the summation being carried out in the range of 1 to 3000 nm in equidistant spacing for each nanometer; and when incorporated in an SSBR/BR rubber compound, the carbon black results in the rubber compound satisfying the relation $\tan \delta_0 / \tan \delta_{60} > 2.76 - 6.7 \times 10^{-3} \times \text{CTAB}$, and results in the rubber compound having a $\tan \delta_{60}$ value which is lower than that of a rubber compound incorporating an equivalent amount of a conventional ASTM carbon black having the same CTAB surface area and 24M4-DBP absorption value, wherein the inversion carbon black, when incorporated in an SSBR/BR rubber compound used in a vehicle tire, results in a vehicle tire exhibiting reduced rolling resistance, improved wear, and improved wet sliding behavior.

13. Inversion carbon black having the following properties:

a CTAB value from 20 to 190 m$^2$/g and a 24M4-DPB absorption value from 40 to 140 mL/100 g;

when incorporated in an SSBR/BR rubber compound, imparts to the resulting rubber compound a $\tan \delta_0 / \tan \delta_{60}$ ratio which is larger than that obtained with an SSBR/BR rubber compound incorporating an equivalent amount of a conventional ASTM carbon black having the same CTAB surface area and 24M4-DBP absorption, which resulting rubber compound satisfies a relationship between $\tan \delta_0 / \tan \delta_{60}$ ratio and CTAB surface area such that a plot of the relationship lies above the line depicted in FIG. 16; and when incorporated in an SSBR/BR rubber compound, imparts to the resulting rubber compound a $\tan \delta_{60}$ value which is less than that of an SSBR/BR rubber compound incorporating an equivalent amount of a conventional ASTM carbon black having the same CTAB surface area and 24M4-DBP absorption, wherein the inversion carbon black, when incorporated in an SSBR/BR rubber compound used in a vehicle tire, results in a vehicle tire exhibiting reduced rolling resistance, improved wear, and improved wet sliding behavior.

* * * * *